US010313763B2

(12) United States Patent
Lai et al.

(10) Patent No.: US 10,313,763 B2
(45) Date of Patent: Jun. 4, 2019

(54) METHOD AND APPARATUS FOR REQUESTING AND RECEIVING SELECTED SEGMENT STREAMS BASED ON PROJECTION INFORMATION

(71) Applicant: MEDIATEK INC., Hsinchu (TW)

(72) Inventors: Wang Lin Lai, San Jose, CA (US); Shan Liu, San Jose, CA (US); Xin Wang, Rancho Palos Verdes, CA (US)

(73) Assignee: MEDIATEK, INC., Hsinchu (TW)

( * ) Notice: Subject to any disclaimer, the term of this patent is extended or adjusted under 35 U.S.C. 154(b) by 0 days.

(21) Appl. No.: 15/660,710

(22) Filed: Jul. 26, 2017

(65) Prior Publication Data
US 2018/0035172 A1 Feb. 1, 2018

Related U.S. Application Data

(60) Provisional application No. 62/368,205, filed on Jul. 29, 2016.

(51) Int. Cl.
*H04N 21/81* (2011.01)
*H04N 7/01* (2006.01)
(Continued)

(52) U.S. Cl.
CPC ......... *H04N 21/816* (2013.01); *H04N 7/0117* (2013.01); *H04N 21/234363* (2013.01); *H04N 21/44008* (2013.01); *H04N 21/8146* (2013.01)

(58) Field of Classification Search
CPC ... H04N 21/816; G06T 3/0043; G06T 3/0056; G06T 3/0087; G06T 19/003; G06T 2207/20108
See application file for complete search history.

(56) References Cited

U.S. PATENT DOCUMENTS

2015/0026242 A1 1/2015 Lim et al.
2017/0236252 A1* 8/2017 Nguyen ............... H04N 13/383
345/419
(Continued)

FOREIGN PATENT DOCUMENTS

CN 1058127529 A 7/2016

OTHER PUBLICATIONS

Lucia D'Acunto, Jorrit van den Berg, Emmanuel Thomas, and Omar Niamut, Using MPEG DASH SRD for zoomable and navigable video, May 2016, MMSys '16, Proceedings of the 7th International Conference on Multimedia Systems, Article No. 34, 4 pages.*

(Continued)

*Primary Examiner* — Jeffery A Brier
(74) *Attorney, Agent, or Firm* — Oblon, McClelland, Maier & Neustadt, L.L.P.

(57) ABSTRACT

Aspects of the disclosure provide an apparatus having an interface circuit, a processing circuit, and a display device. The interface circuit is configured to receive media presentation description information of media data. The media data includes video content on a two-dimensional (2D) plane that is projected from video content of a sphere surface. The video content on the 2D plane includes a plurality of segment streams having different coverages on the 2D plane. The media presentation description information uses projection based spatial relationship description (P-SRD) to describe the different coverages of the video content on the 2D plane according to the projection. The processing circuit is configured to determine one or more segment streams based on a region of interests for image generation and the P-SRD, select segments in the one or more segment streams, and cause the interface circuit to request and receive the selected segments.

20 Claims, 16 Drawing Sheets

(51) Int. Cl.
*H04N 21/2343* (2011.01)
*H04N 21/44* (2011.01)

(56) References Cited

U.S. PATENT DOCUMENTS

2017/0251204 A1* 8/2017 Gupte ................. H04N 13/178
2017/0280126 A1* 9/2017 Van der Auwera .........................
                                                              H04N 13/279
2017/0339469 A1* 11/2017 Trikannad ............ H04N 21/816

OTHER PUBLICATIONS

Iraj Sodagar, The MPEG DASH Standard for Multimedia Streaming over the Internet, Nov. 2011, vol. 18, issue 4, pp. 62-67.*
Information technology—Dynamic adaptive streaming over HTTP (DASH)—Part 1: Media presentation description and segment formats; ISO copyright office, International Standard ISO/IEC 23009-1 Draft third edition May 29, 2016.
Equirectangular projection—Wikipedia, p. 1-3, Jul. 25, 2017.
Taiwan Office Action dated Jul. 25, 2018 issued in TW Application No. 106125489 (partial English translation), 6 pages.
IEE.org/IEEE Xplore Digital Library/IEEE-SA/IEEE Spectrum; "Tiled panoramic video transmission system based on MPEG-DASH", Information and Communication Technology Convergence (ICTC), International Conference Date Oct. 28-30, 2015, 4 pages.

* cited by examiner

| PARAMETER | USE TYPE | DESCRIPTION |
|---|---|---|
| SOURCE_ID | M | NON-NEGATIVE INTEGER IN DECIMAL REPRESENTATION PROVIDING THE IDENTIFIER FOR THE SOURCE OF THE CONTENT |
| GEOMETRY_TYPE | M | NON-NEGATIVE INTEGER DEFINING THE UNDERLYING GEOMETRY USED IN THIS SRD<br>- "0": CONVENTIONAL EUCLIDEAN GEOMETRY<br>- "1": SPHERE GEOMETRY COORDINATOR<br>- "2": SIMPLE INDEXING IN PROJECTED 2D PLANE<br>- OTHER RESERVED |
| REGION_YAW_MIN | CM | MANDATORY, IF GEOMETRY_TYPE = 1<br>THE MINIMUM YAW ANGLE, IN DEGREES, OF THIS SRD REGION. |
| REGION_YAW_MAX | CM | MANDATORY, IF GEOMETRY_TYPE = 1<br>THE MAX YAW ANGLE, IN DEGREES, OF THIS SRD REGION. |
| REGION_PITCH_MIN | CM | MANDATORY, IF GEOMETRY_TYPE = 1<br>THE MINIMUM PITCH ANGLE, IN DEGREES, OF THIS SRD REGION. |
| REGION_PITCH_MAX | CM | MANDATORY, IF GEOMETRY_TYPE = 1<br>THE MAXIMUM PITCH ANGLE, IN DEGREES, OF THIS SRD REGION. |
| TOTAL_YAW_MIN | O | PRESENT ONLY IF GEOMETRY_TYPE = 1<br>THE MINIMUM YAW ANGLE, IN DEGREES, SUPPORTED BY THE REFERENCE SPACE |
| TOTAL_YAW_MAX | O | PRESENT ONLY IF GEOMETRY_TYPE = 1<br>THE MAXIMUM YAW ANGLE, IN DEGREES, SUPPORTED BY THE REFERENCE SPACE |
| TOTAL_PITCH_MIN | O | PRESENT ONLY IF GEOMETRY_TYPE = 1<br>THE MINIMUM PITCH ANGLE, IN DEGREES, SUPPORTED BY THE REFERENCE SPACE |
| TOTAL_PITCH_MAX | O | PRESENT ONLY IF GEOMETRY_TYPE = 1<br>THE MAXIMUM PITCH ANGLE, IN DEGREES, SUPPORTED BY THE REFERENCE SPACE |
| REGION_FACE | CM | MANDATORY, IF GEOMETRY_TYPE = 2<br>INTEGER VALUE INDICATING THE FACE IN THE PROJECTED 2D PLANE. |
| TOTAL_FACE | CM | MANDATORY, IF GEOMETRY_TYPE = 2<br>INDICATE THE TOTAL NUMBER OF FACE IN THE PROJECTION. |
| SPATIAL_SET_ID | O | OPTIONAL NON-NEGATIVE INTEGER IN DECIMAL REPRESENTATION PROVIDING AN IDENTIFIER FOR A GROUP OF REGIONS.<br>IF SPATIAL_SET_ID IS PRESENT, TOTAL_YAW_MIN, TOTAL_YAW_MAX, TOTAL_YAW_MIN, TOTAL_YAW_MAX SHALL ALSO PRESENT |

LEGEND FOR USE TYPE: M=MANDATORY, O=OPTIONAL, CM=CONDITIONALLY MANDATORY

FIG. 8

```
<MPD>
  <Period>
    <!-- Region 1 (base-360) -->
    <AdaptationSet segmentAlignment="true" subsegmentStartsWithSAP="1">
      <SupplementalProperty schemeIdUri="urn:mpeg:dash:vr-srd:2016"
        value="0,1,0,360,-90,90,0,360,-90,90,1"/>
      <Representation mimeType="video/mp4" codecs="avc1.42c01e" bandwidth="10000"
      </Representation>
    </AdaptationSet>
    ...
    <!-- Region 2 (upper-left region, in middle partitioning) -->
    <AdaptationSet segmentAlignment="true" subsegmentStartsWithSAP="1">
      <Role schemeIdUri="urn:mpeg:dash:role:2011" value="supplementary"/>
      <SupplementalProperty schemeIdUri="urn:mpeg:dash:vr-srd:2016"
        value="0,1,0,180,0,90,0,360,-90,90,2"/>
      <Representation mimeType="video/mp4" codecs="avc1.42c01e" bandwidth="10000"
      </Representation>
    </AdaptationSet>
    ...
    <!-- Region 6 (upper-left corner region, in high resolution partitioning) -->
    <AdaptationSet segmentAlignment="true" subsegmentStartsWithSAP="1">
      <Role schemeIdUri="urn:mpeg:dash:role:2011" value="supplementary"/>
      <SupplementalProperty schemeIdUri="urn:mpeg:dash:vr-srd:2016"
        value="0,1,0,90,45,90,0,360,-90,90,3"/>
      <Representation mimeType="video/mp4" codecs="avc1.42c01e" bandwidth="10000"
      </Representation>
    </AdaptationSet>
    ...
    <!-- Region 21 (bottom-right corner region, in high resolution partitioning) -->
    <AdaptationSet segmentAlignment="true" subsegmentStartsWithSAP="1">
      <Role schemeIdUri="urn:mpeg:dash:role:2011" value="supplementary"/>
      <SupplementalProperty schemeIdUri="urn:mpeg:dash:vr-srd:2016"
        value="0,1,270,360,-90,-45,0,360,-90,90,3"/>
      <Representation mimeType="video/mp4" codecs="avc1.42c01e" bandwidth="10000"
      </Representation>
    </AdaptationSet>
    ...
  </Period>
</MPD>
```

FIG. 11

```
<MPD>
  ...
  <Period>
    <AdaptationSet segmentAlignment="true" subsegmentStartsWithSAP="1">
      <!-- Region 1 -->
      <Region (Server viewport)>
        <SupplementalProperty schemeIdUri="urn:mpeg:dash:vr-srd:2016" value="0,1,0,180,0,90 "/>
        <Representation id="r1_1" mimeType="video/mp4" codecs="avc1.42c01e" bandwidth="10000"</>
        ...
        <Representation id="r1_3" mimeType="video/mp4" codecs="avc1.42c01e" bandwidth="50000" </>
      </Region>
      <!-- Region 2 -->
      <Region (Server viewport)>
        <SupplementalProperty schemeIdUri="urn:mpeg:dash:vr-srd:2016" value="0,1,180,360,0,90 "/>
        <Representation id="r2_1" dependencyId="r1_1" mimeType="video/mp4" codecs="avc1.42c01e" bandwidth="10000"</>
        ...
        <Representation id="r2_3" dependencyId="r1_3" mimeType="video/mp4" codecs="avc1.42c01e" bandwidth="50000"</>
      </Region>
      <!-- Region 3 -->
      <Region (Server viewport)>
        <SupplementalProperty schemeIdUri="urn:mpeg:dash:vr-srd:2016" value="0,1,0,180,-90,0 "/>
        <Representation id="r3_1" dependencyId="r3__1" mimeType="video/mp4" codecs="avc1.42c01e" bandwidth="10000"</>
        ...
        <Representation id="r3_3" dependencyId="r3_3" mimeType="video/mp4" codecs="avc1.42c01e" bandwidth="50000"</>
      </Region>
      <!-- Region 4 -->
      <Region (Server viewport)>
        <SupplementalProperty schemeIdUri="urn:mpeg:dash:vr-srd:2016" value="0,1,180,360,-90,0 "/>
        <Representation id="r4_1" dependencyId="r3_1" mimeType="video/mp4" codecs="avc1.42c01e" bandwidth="10000"</>
        ...
        <Representation id="r4_3" dependencyId="r3_3" mimeType="video/mp4" codecs="avc1.42c01e" bandwidth="50000"</>
      </Region>
    </AdaptationSet>
  </Period>
</MPD>
```

FIG. 14

```
<MPD
...>
<Period>
  <AdaptationSet segmentAlignment="true" subsegmentStartsWithSAP="1">
    <!-- Region 1 -->
    <Region>
      <SupplementalProperty schemeIdUri="urn:mpeg:dash:vr-srd:2016" value="0,1,0,180,0,90"/>
      <Representation id="r1_1" mimeType="video/mp4" codecs="avc1.42c01e" bandwidth="1000"/>
      ...
      <Representation id="r1_3" dependencyId="r1_1" mimeType="video/mp4" codecs="avc1.42c01e" bandwidth="50000"/>        1510
    </Region>
    <!-- Region 2 -->
    <Region>
      <SupplementalProperty schemeIdUri="urn:mpeg:dash:vr-srd:2016" value="0,1,180,360,0,90 "/>
      <Representation id="r2_1" mimeType="video/mp4" codecs="avc1.42c01e" bandwidth="1000"/>
      ...
      <Representation id="r2_3" dependencyId="r2_1" mimeType="video/mp4" codecs="avc1.42c01e" bandwidth="50000"/>        1520
    </Region>
    <!-- Region 3 -->
    <Region>
      <SupplementalProperty schemeIdUri="urn:mpeg:dash:vr-srd:2016" value="0,1,0,180,-90,0 "/>
      <Representation id="r3_1" mimeType="video/mp4" codecs="avc1.42c01e" bandwidth="1000"/>
      ...
      <Representation id="r3_3" dependencyId="r3_1" mimeType="video/mp4" codecs="avc1.42c01e" bandwidth="50000"/>        1530
    </Region>
    <!-- Region 4 -->
    <Region>
      <SupplementalProperty schemeIdUri="urn:mpeg:dash:vr-srd:2016" value="0,1,180,360,-90,0 "/>
      <Representation id="r4_1" mimeType="video/mp4" codecs="avc1.42c01e" bandwidth="1000"/>
      ...
      <Representation id="r4_3" dependencyId="r4_1" mimeType="video/mp4" codecs="avc1.42c01e" bandwidth="50000"/>        1540
    </Region>
  </AdaptationSet>
</Period>
</MPD>
```

```xml
<MPD>
  <Period>
    <AdaptationSet segmentAlignment="true" subsegmentStartsWithSAP="1">
      <!-- Region 1 -->
      <Region>
        <SupplementalProperty schemeIdUri="urn:mpeg:dash:vr-srd:2016" value="0,1, 0,180,0,90"/>
        <Representation id="r1_1" mimeType="video/mp4" codecs="avc1.42c01e" width="960"/>
        <Representation id="r1_2" dependencyId="r1_1" mimeType="video/mp4" codecs="avc1.42c01e" width="1920"/>  1610
      </Region>
      <!-- Region 2 -->
      <Region>
        <SupplementalProperty schemeIdUri="urn:mpeg:dash:vr-srd:2016" value="0,1, 180,360,0,90"/>
        <Representation id="r2_1" mimeType="video/mp4" codecs="avc1.42c01e" width="960"/>
        <Representation id="r2_2" dependencyId="r2_1" mimeType="video/mp4" codecs="avc1.42c01e" width="1920"/>  1620
      </Region>
      <!-- Region 3 --> (Server viewport)
      <Region>
        <SupplementalProperty schemeIdUri="urn:mpeg:dash:vr-srd:2016" value="0,1, 0,180,-90,0"/>
        <Representation id="r3_1" mimeType="video/mp4" codecs="avc1.42c01e" width="960"/>
        <Representation id="r3_2" dependencyId="r3_1" mimeType="video/mp4" codecs="avc1.42c01e" width="1920"/>  1630
      </Region>
      <!-- Region 4 --> (Server viewport)
      <Region>
        <SupplementalProperty schemeIdUri="urn:mpeg:dash:vr-srd:2016" value="0,1, 180,360,-90,0"/>
        <Representation id="r4_1" mimeType="video/mp4" codecs="avc1.42c01e" width="960"/>
        <Representation id="r4_2" dependencyId="r4_1" mimeType="video/mp4" codecs="avc1.42c01e" width="1920"/>  1640
      </Region>
    </AdaptationSet>
  </Period>
</MPD>
```

FIG. 16

METHOD AND APPARATUS FOR REQUESTING AND RECEIVING SELECTED SEGMENT STREAMS BASED ON PROJECTION INFORMATION

INCORPORATION BY REFERENCE

This present disclosure claims the benefit of U.S. Provisional Application No. 62/368,205, "Methods and Apparatus of signalling Spatial Relationship and Dependency for VR and 360 video Content" filed on Jul. 29, 2016, which is incorporated herein by reference in its entirety.

TECHNICAL FIELD

The present disclosure describes embodiments generally related to video coding method and apparatus, and more particularly related to omnidirectional video coding technology.

BACKGROUND

The background description provided herein is for the purpose of generally presenting the context of the disclosure. Work of the presently named inventors, to the extent the work is described in this background section, as welt as aspects of the description that may not otherwise qualify as prior art at the time of filing, are neither expressly nor impliedly admitted as prior art against the present disclosure.

Three-dimensional environments can be rendered to provide special user experience. For example, in a virtual reality application, computer technologies create realistic images, sounds and other sensations that replicate a real environment or create an imaginary setting, thus a user can have a simulated experience of a physical presence in a three-dimensional environment.

SUMMARY

Aspects of the disclosure provide an apparatus having an interface circuit, a processing circuit and a display device. The interface circuit is configured to receive media presentation description information of media data. The media data includes video content in a two-dimensional (2D) plane that is projected from video content of a sphere surface according to a projection. The video content in the 2D plane includes a plurality of segment streams having different video coverage in the 2D plane. The media presentation description information uses projection based spatial relationship description (SRD) to describe the different video coverage in the 2D plane according to the projection. The processing circuit is configured to determine one or more segment streams based on a region of interests for image generation and the projection based spatial relationship description, select segments in the one or more segment streams, and cause the interface circuit to request and receive the selected segments. The display device is configured to display images generated based on the selected segments.

In an embodiment, the processing circuit is configured to parse a projection indicator from the projection based spatial relationship description. Further, in an example, the processing circuit is configured to parse yaw and pitch coordinates in a sphere coordinate system from the projection based spatial relationship description when the projection indicator is indicative of an equirectangular projection (ERP). In an example, the processing circuit is configured to parse a minimum value of yaw coordinate, a maximum value of yaw coordinate, a minimum value of pitch coordinate, and a maximum value of pitch coordinate from the projection based spatial relationship description that define a region in the 2D plane. In another example, the processing circuit is configured to parse yaw and pitch coordinates that define a corner point of a rectangular region, and parse a width and a height of the rectangular region in yaw and pitch coordinates from the projection based spatial relationship description.

In another embodiment, the processing circuit is configured to parse one or more face indexes from the projection based spatial relationship description when the projection indicator is indicative of a platonic solid projection. Further, in an embodiment, the processing circuit is configured to parse coordinates in an Euclidean coordinate system from the projection based spatial relationship description when the projection indicator is indicative of no projection.

According to an aspect of the disclosure, the processing circuit is configured to parse the media presentation description information to extract a dependency of a first segment stream to a second segment stream, and select segments in the first segment stream and the second segment stream, and cause the interface circuit to request and receive the selected segments. For example, the processing circuit is configured to extract at least one of a region dependency, a bandwidth dependency and an image size dependency of the first segment stream to the second segment stream.

In an embodiment, the media presentation description information uses projection based spatial relationship description (SRD) in at least one of an adaptation set level, a representation level, a sub-representation level to describe the different video coverage in the 2D plane according to the projection.

Aspects of the disclosure provide a method for image rendering. The method includes receiving media presentation description information of media data. The media data includes video content in a 2D plane that is projected from video content of a sphere surface according to a projection. The video content in the 2D plane includes a plurality of segment streams having different video coverage in the 2D plane. The media presentation description information uses projection based spatial relationship description (SRD) to describe the different video coverage in the 2D plane according to the projection. The method further includes determining one or more segment streams based on a region of interests for image generation and the projection based spatial relationship description, selecting segments in the one or more segment streams, transmitting a request for the selected segments, receiving the selected segments, and displaying images generated based on the selected segments.

BRIEF DESCRIPTION OF THE DRAWINGS

Various embodiments of this disclosure that are proposed as examples will be described in detail with reference to the following figures, wherein like numerals reference like elements, and wherein:

FIG. 8 shows a table 800 of parameters that are used in a projection based spatial relationship description according to an embodiment of the disclosure; and FIGS. 9-16 show examples of media presentation description according to embodiments of the disclosure.

DETAILED DESCRIPTION OF EMBODIMENTS

Figure 1:
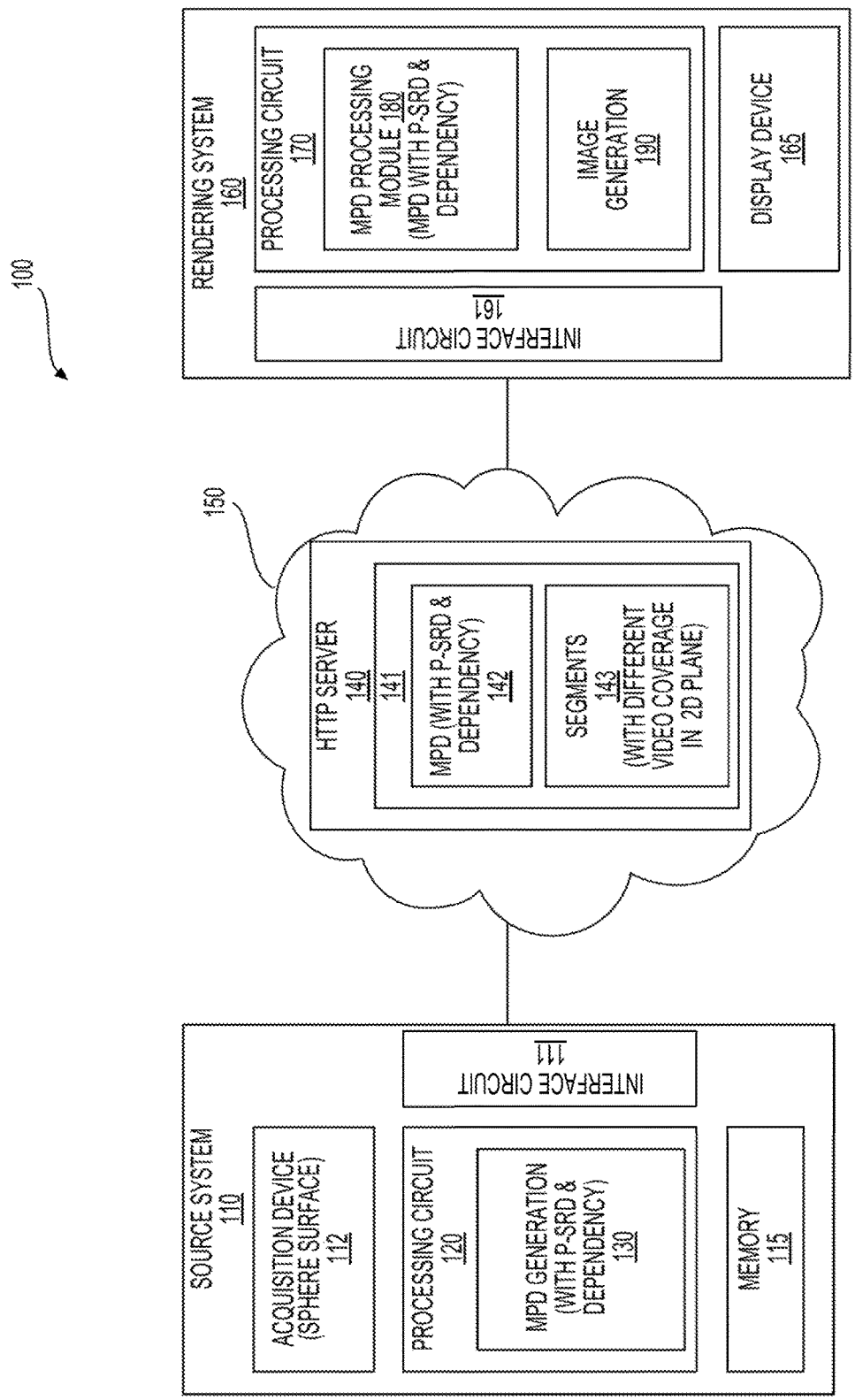
FIG. 1 shows a block diagram of a media system 100 according to an embodiment of the disclosure.

FIG. 1 shows a block diagram of a media system 100 according to an embodiment of the disclosure. The media system 100 includes a source system 110, a delivery system 150 and a rendering system 160 coupled together. The source system 110 is configured to acquire media data for three-dimensional environments and suitably encapsulate the media data. The delivery system 150 is configured to deliver the encapsulated media data from the source system 110 to the rendering system 160. The rendering system 160 is configured to render simulated three-dimensional environments according to the media data.

According to an aspect of the disclosure, the source system 110 is configured to acquire visual data of a three-dimensional (3D) sphere surface, project the visual data of the sphere surface onto a two-dimension (2D) plane, such as 2D rectangular images, and generate segment streams having different video coverages (e.g., region coverages, quality coverages) in the plane according to the projection, and include spatial information for the segment streams in a description file, such as a media presentation description (MPD) file. In an embodiment, the MPD file uses a projection based spatial relationship description (SRD) to describe the different video coverages of the segment streams on the 2D plane. Further, in an embodiment, the MPD file includes a dependency description to assist video coding. The dependency description can include region dependency of the video content at different regions, bandwidth dependency of video content for different bandwidths, image size dependency of the video content of different image sizes. The delivery system 150 is configured to store the description file, the segment streams for the video content, and other suitable media data. Further, the rendering system 160 can download the description file, and determine one or more segment streams based on spatial requirement (e.g., a region of interests for image generation) and spatial information, such as the projection based SRD, the dependency description, and the like. Further, the rendering system 160 can select segments from the one or more segment streams, and request the selected segments from the delivery system 150. When the rendering system 160 receives the selected segments, the rendering system 160 can generate images of the region of interest based on the selected segments.

The source system 110 can be implemented using any suitable technology. In an example, components of the source system 110 are assembled in a device package. In another example, the source system 110 is a distributed system, components of the source system 110 can be arranged at different locations, and are suitable coupled together for example by wire connections and/or wireless connections.

In the FIG. 1 example, the source system 110 includes an acquisition device 112, a processing circuit 120 (e.g., including an image processing circuit, an audio processing circuit and the like), a memory 115, and an interface circuit 111 coupled together.

The acquisition device 112 is configured to acquire various media data, such as images, videos, sound, and the like of three-dimensional environments. The acquisition device 112 can have any suitable settings. In an example, the acquisition device 112 includes a camera rig (not shown) with multiple cameras, such as an imaging system with two fisheye cameras, a tetrahedral imaging system with four cameras, a cubic imaging system with six cameras, an octahedral imaging system with eight cameras, an icosahedral imaging system with twenty cameras, and the like, configured to take images and/or videos of various directions in a surrounding space.

In an embodiment, the images and/or videos taken by the cameras are overlapping, and can be stitched to provide a larger coverage of the surrounding space than a single camera. In an example, the images and/or videos taken by the cameras can provide 360° sphere coverage of the whole surrounding space. It is noted that the images and/or videos taken by the cameras can provide less than 360° sphere coverage of the surrounding space.

The media data acquired by the acquisition device 112 can be suitably stored or buffered, for example in the memory 115. The processing circuit 120 can access the memory 115, process the media data, and encapsulate the media data in suitable format. The encapsulated media data is then suitably stored or buffered, for example in the memory 115.

In an embodiment, the processing circuit 120 includes an audio processing path configured to process audio data, and includes an image/video processing path configured to process image/video data. The processing circuit 120 then encapsulates the audio, image and video data with metadata according to a suitable format.

In an example, on the image/video processing path, the processing circuit 120 can stitch images taken from different cameras together to form a stitched image, such as an omnidirectional image, and the like. Then, the processing circuit 120 can project the omnidirectional image according to suitable two-dimensional (2D) plane to convert the omnidirectional image to 2D images that can be encoded using 2D encoding techniques. Then the processing circuit 120 can suitably encode the image and/or a stream of images.

According to an aspect of the disclosure, the processing circuit 120 can project the omnidirectional images of the sphere surface to the 2D images on the 2D plane according to different projection techniques, and the different projection techniques cause the 2D images of the 2D plane to have different spatial relationship characteristics that are associated with the projection techniques. Thus, in an embodiment, the spatial relationship is described based on the projection. In an example, the projection based SRD uses different spatial description techniques associated with the different projections. Further, in an example, the projection based SRD is configured to be back-compatible with the general two-dimensional SRD that is used for 2D images without projection.

It is noted that the processing circuit 120 can project the omnidirectional image according to any suitable projection technique. In an embodiment, the processing circuit 120 can project the omnidirectional image using the equirectartgular projection (ERP). The ERP projection projects a sphere surface, such as omnidirectional image, to a two-dimensional (2D) plane, such as a 2D image, in a similar manner as projecting earth surface to a map. In an example, the sphere surface (e.g., earth surface) uses spherical coordinate system of yaw (e.g., longitude) and pitch (e.g., latitude), and the 2D plane uses XY coordinate system. During the projection, the yaw circles are transformed to the vertical lines and the pitch circles are transformed to the horizontal lines, the yaw circles and the pitch circles are orthogonal in the spherical coordinate system, and the vertical lines and the horizontal lines are orthogonal in the XY coordinate system.

In the embodiment of ERP projection, patterns are deformed (e.g., stretched) in the horizontal direction (along the latitude direction) during ERP projection and are deformed with different degrees based on the latitudes. The ERP projection can keep spatial continuity, thus neighboring objects on the sphere surface are also neighboring objects in the 2D plane. In an embodiment, yaw and pitch (e.g., longitude and latitude) can be used to identify locations in the 2D plane.

In another embodiment, the processing circuit 120 can project the omnidirectional image to surfaces of platonic solid, such as tetrahedron, cube, octahedron, icosahedron, and the like. The projected surfaces can be respectively rearranged, such as rotated, relocated to form a 2D image. The 2D images are then encoded.

According to an aspect of the disclosure, the platonic solid projection can break spatial continuity in the sphere surface, neighboring objects in the sphere surface may not be neighboring objects in the 2D plane. In some embodiments, dummy faces are added, and the dummy faces have no or little image information. In an example, because, of the re-arrangement of faces during projection, neighboring faces may or may not have spatial relationship, such as similarity, dependency, and the like. Non-neighboring faces may have spatial relationship, such as similarity, dependency, and the like. In an embodiment, face indexes are used to locate regions in the 2D plane for the platonic solid projection.

It is noted that, in an embodiment, the projection operation is performed by components other than the processing circuit 120. In an example, images taken from the different cameras are arranged in a 2D plane to form a 2D image. It is also noted that, in an embodiment, the processing circuit 120 can encode images taken from the different cameras, and does not perform the stitch operation and/or the projection operation on the images.

It is also noted that the processing circuit 120 can encapsulate the media data using any suitable format. In an example, the media data is encapsulated in a single track. For example, the ERP projection projects a sphere surface onto a 2D plane, and the single track can include a flow of rectangular images of the 2D plane.

In another example, the media data is encapsulated in multiple tracks. In an example, the ERP projection projects a sphere surface onto a 2D plane, and the 2D plane is divided into multiple sub-picture regions. A track can include a flow of images of one or more sub-picture regions. In another example, a track can include a flow of images from one or more cameras. In another example, a track can include a flow of images of one or more projection faces of a platonic solid.

According to an aspect of the disclosure, the processing circuit 120 is configured to generate segment streams from media data based on various media characteristics, such as time period, spatial characteristic, media type, language, encoding scheme, and the like. Further, the processing circuit 120 is configured to generate a catalog, such as a media presentation description (MPD) file, and the like. The catalog includes the media characteristics of segment streams and can assist a rendering system, such as the rendering system 160 to request a sequence of segments.

In an embodiment, the MPD file uses projection based SRD to describe the different video coverage in the 2D plane. In an example, the projected based SRD is used to describe video coverage for different projections and is back compatible with 2D video processing that does not use projection. Further, in an embodiment, the MPD file includes dependency descriptions to assist video coding.

In the FIG. 1 example, the processing circuit 120 includes an MPD generation module 130 configured to generate the MPD file that includes media characteristics of segment streams, and the media characteristics include the spatial characteristic. The MPD file can be used by a rendering system, such as the rendering system 160, to select segments in order to meet client and environment requirements, such as a region of interests, language, network bandwidth, user preference, and the like.

Specifically, in an embodiment, the processing circuit 120 can generate an adaptation set for video content, and generate alternative representations of the video content. In an example, the video content is for a sphere surface and the video content of the sphere surface is projected to generate video content in a two-dimensional plane, video content in the two dimensional plane can be partitioned into sub-picture (also referred to as sub-pic) regions of same size or different sizes. It is noted that any suitable projection or mapping that projects or maps a sphere surface to a two-dimensional plane can be used, such as ERP projection, platonic solid projection, and the like.

According to an aspect of the disclosure, the projection based SRD can be used to signal spatial characteristics (e.g., locations, dependencies and the like) at various levels, such as adaptation set level, representation level, sub-representation level, and the like in the Moving Picture Experts Group (MPEG) DASH.

In an embodiment, the MPD file includes multiple adaptation sets for video. The multiple adaptation sets are respectively for sub-picture regions, such as a first adaptation set for a first region, a second adaptation set for a second region, and the like. The sub-picture regions can be partitions of the 2D plane, can be faces in the 2D plane, and can be multiple resolution partitions of the 2D plane. In the embodiment, the projection based SRD can be used to signal spatial characteristics (e.g., locations, dependencies and the like) of the sub-picture regions at adaptation set level.

In another embodiment, the MPD file includes an adaptation set for video. The adaptation set includes sets of representations for respective sub-picture regions, such as a first set of alternative representations for a first region, a second set of alternative representations for a second region, and the like. A representation corresponds to a segment stream having a plurality of segments for consecutive time slots. In an example, the alternative representations have different video qualities, such as different resolutions, that are suit for different bandwidths, different bitrates and the like. In the embodiment, the projection based SRD can be used to signal spatial characteristics (e.g., locations, dependencies and the like) of the sub-picture regions at the representation level.

In another embodiment, the MPD file includes an adaptation set for video. The adaptation set includes a set of representations having different qualities, such as a first representation of a first quality, a second representation of a second quality, and the like. Further, a representation includes multiple sub-representations respectively for the sub-picture regions. For example, the first representation includes a first sub-representation for a first region, a second sub-representation for a second region. In the embodiment, the projection based SRD can be used to signal spatial characteristics (e.g., locations, dependencies and the like) of the sub-picture regions at the sub-representation level.

The various forms of MPD file will be discussed with reference to FIGS. 2-3 and FIGS. 8-16.

In an embodiment, the processing circuit 120 is implemented using one or more processors, and the one or more processors are configured to execute software instructions to perform media data processing. In another embodiment, the processing circuit 120 is implemented using integrated circuits.

In the FIG. 1 example, the segment streams and the MPD file are provided to the delivery system 150 via the interface circuit 111. The delivery system 150 is configured to suitably provide the media data to client devices, such as the rendering system 160. In the FIG. 1 example, the delivery system 150 includes a hypertext transfer protocol (HTTP) server 140 with a memory 141. The memory 141 stores an MPD file 142 and segments 143. The MPD file 142 includes respective addresses (e.g., URL addresses) for the segments 143. In the FIG. 1 example, the MPD file 142 uses projection based SRD (P-SRD) to describe spatial characteristics. The HTTP server 140 is configured to provide segments to a rendering system, such as the rendering system 160, according to an HTTP protocol. The components of the delivery system 150 are suitably coupled together via wired and/or wireless connections. The delivery system 150 is suitably coupled with the source system 110 and the rendering system 160 via wired and/or wireless connections.

The rendering system 160 can be implemented using any suitable technology. In an example, components of the rendering system 160 are assembled in a device package. In another example, the rendering system 160 is a distributed system, components of the source system 110 can be located at different locations, and are suitable coupled together by wire connections and/or wireless connections.

In the FIG. 1 example, the rendering system 160 includes an interface circuit 161, a processing circuit 170 and a display device 165 coupled together. The interface circuit 161 is configured to transmit messages, such as request messages, and the like to the delivery system 150 to request media data, and is configured to receive messages of media data, such as the MPD file 142, segments, and the like from the delivery system 150.

The processing circuit 170 is configured to process the media data and generate images for the display device 165 to present to one or more users. The display device 165 can be any suitable display, such as a television, a smart phone, a wearable display, a head-mounted device, and the like.

According to an aspect of the disclosure, the processing circuit 170 is configured to cause the interface circuit 161 to request an MPD file and the process the MPD file. Further, the processing circuit 170 can determine client and environment requirements, such as a region of interests, language, network bandwidth, user preference, and the like. In an example, the processing circuit 170 can detect a region of interests. For example, the processing circuit 170 determines the region of interests based on a position of a head-mounted device. Based on the region of interests, the processing circuit 170 can determine a spatial requirement. The processing circuit 170 can determine other requirement, such as a bitrate requirement. In an example, the processing circuit 170 can detect a network status. For example, the processing circuit 174 can monitor a buffer (not shown) configured to buffer segment streams provided by the delivery system 150 to detect the network status. In an example, based on the network status, the processing circuit 170 can determine the bitrate requirement.

Further, according to an aspect of the disclosure, the processing circuit 170 can determine one or more segment streams of video content based on the MPD file to satisfy the spatial requirement, and other suitable requirements, such as the bitrate requirement. The processing circuit 170 can then select segments in the determined segment streams, and cause the interface circuit 161 to request the selected segments from the HTTP server 140 based on the addresses of the selected segments in the MPD file.

It is noted that the processing circuit 170 can determine segment streams of other media data, such as audio, and the like, select segments from the determined segment streams of the other media data and cause the interface circuit 161 to request the selected segments from the HTTP server 140.

In an embodiment, when the requested segments of media data are received via the interface circuit 161, the processing circuit 170 can process the segments. For example, the processing circuit 170 can decode segments of the video content and generate images accordingly. The display device 165 can present the generated images to the one or more users.

In an example, the processing circuit 170 includes a MPD processing module 180 and an image generation module 190. The MPD processing module 180 is configured to process the MPD file, determine one or more segment streams of video content based on the spatial information in the MPD file, select segments in the determined segment stream, extract the addresses (e.g., URL address) of the selected segments and use the addresses to request segments from the HTTP server 140 for example. The image generation module 190 is configured to generate images of the region of interests based on the received segments. The MPD processing module 180 and the image generation module 190 can be implemented as processors executing software instructions and can be implemented as integrated circuits.

In an embodiment, the MPD processing module 180 processes the MPD file, extracts projection based SRD, parses the projection based SRD, and determines whether the MPD file is for omnidirectional video that uses a projection to project omnidirectional images of the sphere surface to the 2D images on the 2D plane. When the MPD file is for omnidirectional video, the MPD processing module 180 determines, based on the projection based SRD, the type of projection, and further processes the projection based SRD based on the type of projection. In an example, the MPD processing module 180 can extract spatial information for segment streams, and can extract dependency information of the segment streams. Based on the spatial information and the dependency information of the segment streams, the processing circuit 170 can select one or more segment streams, and further select segments to request.

Figure 2:
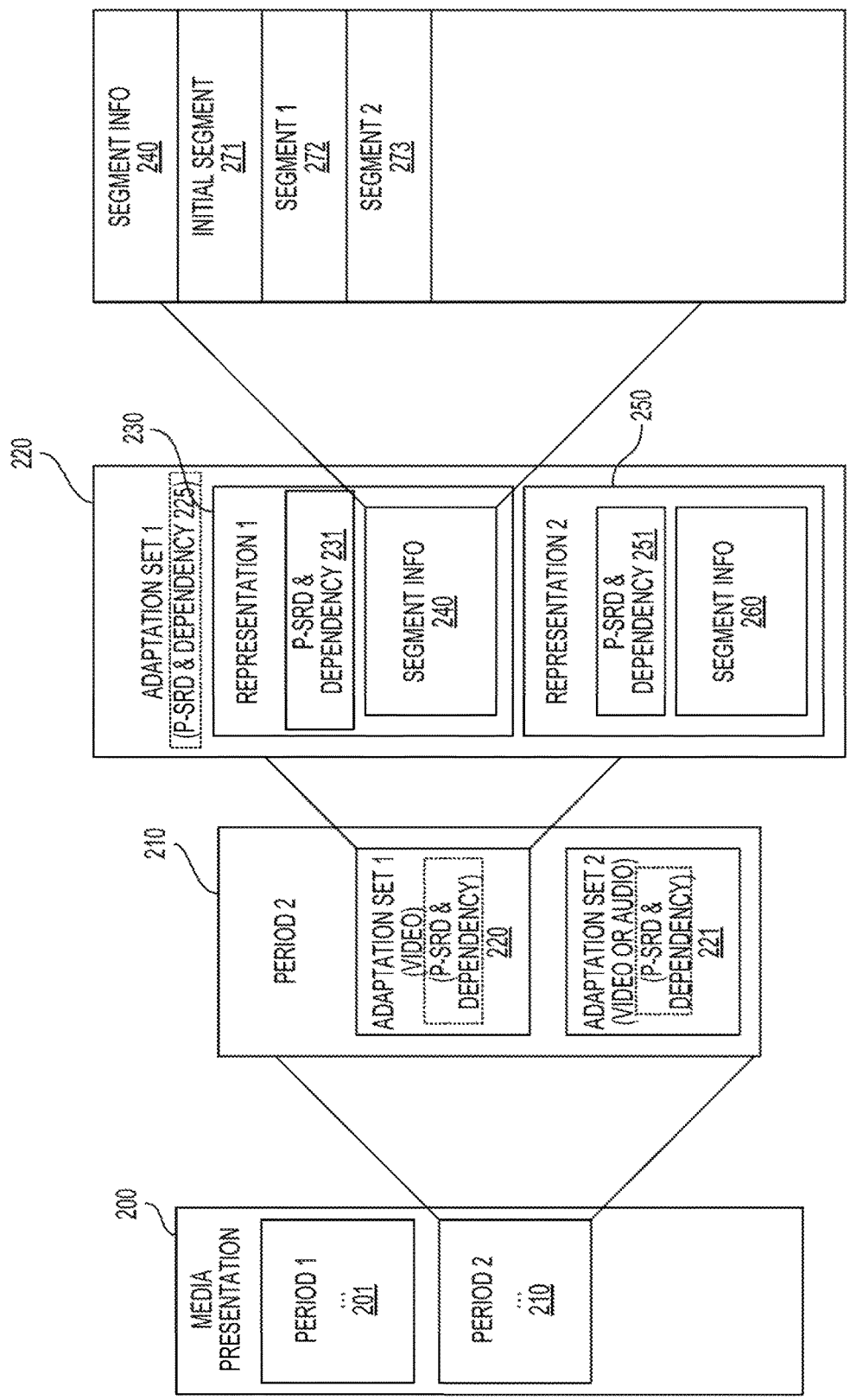
FIG. 2 shows an example of media presentation 200 according to an embodiment of the disclosure.

FIG. 2 shows an example of media presentation 200 according to an embodiment of the disclosure. In an example, the MPD generation module 130 is configured to generate a MPD file based on the media presentation 200, the memory 141 is configured to store the MPD file, and the MPD processing module 180 is configured to process the MPD file.

In the FIG. 2 example, the media presentation 200 represents structures to arrange encoded media data of media content. In the FIG. 2 example, the media content is sliced according to time, and the media presentation 200 includes a sequence of one or more periods, such as a first period 201 (e.g., PERIOD 1) of media content (e.g., advertisement), a second period 210 (e.g., PERIOD 2) of media content (e.g., movie), and the like. Each period corresponds to a time internal. In an example, the sequence of periods is consecutive and non-overlapping. For example, the first period 201 starts at 0-second, and lasts for 100 seconds, the second period 210 starts at 100th second, and lasts 195 seconds, and the like.

Further, in the FIG. 2 example, a period of media content includes a plurality of adaptation sets that correspond to different media components. For example, the second period 210 includes a first adaptation set 220 of video component, a second adaptation set 221 of audio component or video component, and the like.

In an embodiment, both the first adaptation set 220 and the second adaptation set 221 correspond to video components with different coverage in spatial domain. The first adaptation set 220 and the second adaptation set 221 are sections for sub-picture regions, and include geometry information respectively in the sections for the sub-picture regions. For example, the first adaptation set 220 includes one or more representations for a first sub-picture region, and the second adaptation set 221 includes one or more representations for a second sub-picture region that is different from the first sub-picture region. When the second adaptation set 221 corresponds to video component, the second adaptation set 221 is similarly configured as the first adaptation set 220. In the embodiment, the projection based SRD can be used to signal spatial characteristics (e.g., locations, dependencies and the like) of the sub-picture regions at adaptation set level.

Further, in the FIG. 2 example, an adaptation set includes one or more representations for media component. The representations can have spatial and/or other differences (e.g., quality). For example, the first adaptation set 220 includes one or more representations of video content, such as a first representation 230, a second representation 250, and the like having different coverage in spatial domain and/or other difference. In an example, the first representation 230 and the second representation 250 are alternative representations of the same video content. The first representation 230 and the second representation 250 can have different coverage in spatial domain (e.g., region coverage, quality coverage). In an example, at a time in the second period 210, one of the first representations 230 and the second representation 250 can be selected.

In the FIG. 2 example, a representation corresponds to a segment stream. In the MPD file, a representation includes specific information for the segment stream. In the embodiment, the projection based SRD can be used to signal spatial characteristics (e.g., locations, dependencies and the like) of the sub-picture regions at the representation level. For example, the first representation 230 includes P-SRD 231 that is projection based SRD to signal the spatial characteristics, such as region coverage, and the like. In an example, the P-SRD 231 can be used by a rendering system, such as the rendering system 160 to determine whether the first segment stream satisfies the spatial requirement. The first representation 230 also includes segment information 240 for the first segment stream. Similarly, the second representation 250 includes P-SRD 251 and segment information 260.

In an example, when two or more representations correspond to a same region for example with different qualities, the MPD file can include a region section above the representation level, and include a copy of P-SRD at the region section, such the P-SRD 225 in the FIG. 2 example.

In the FIG. 2 example, the segment information 240 includes segment initialization information 271, a first segment information 272 for a first segment in the first segment stream, a second segment information 273 for a second segment in the first segment stream, and the like. The first segment information 272 can include timing information of the first segment, and an address, such as URL address for the first segment. In an example, the timing information indicates a sub time internal in the first period 201. The timing information can be used, for example by the rendering system 160, to select segments in a determined segment stream. The addresses can be used by the rendering system 160 to request the selected segments from the HTTP server 140.

Figure 3:
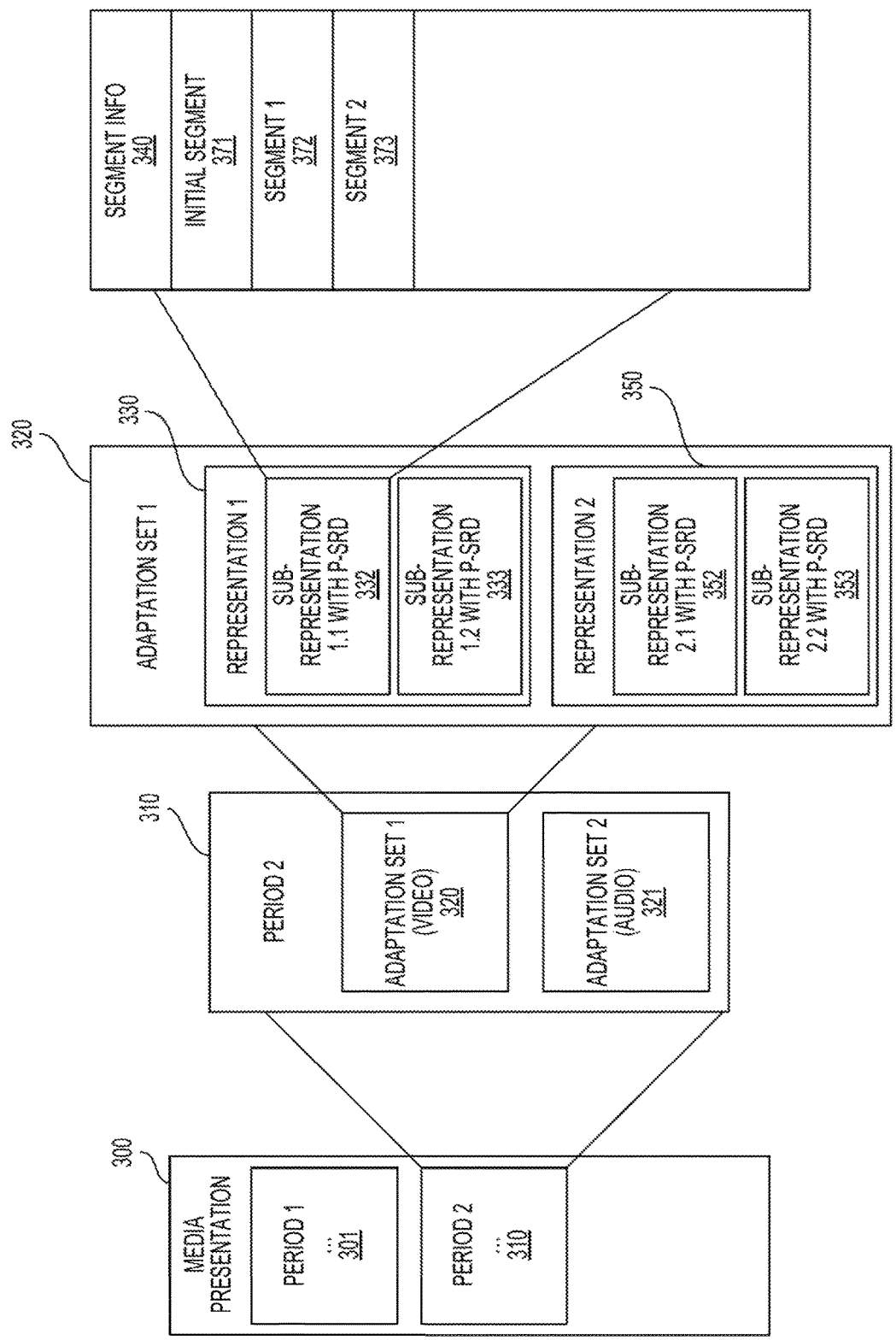
FIG. 3 shows an example of another media presentation 300 according to an embodiment of the disclosure.

FIG. 3 shows an example of media presentation 300 according to an embodiment of the disclosure. In an example, the MPD generation module 130 is configured to generate a MPD file based on the media presentation 300, the memory 141 is configured to store the MPD file, and the MPD processing module 180 is configured to process the MPD file.

The media presentation 300 includes similar structures as the media presentation 200. For example, the media presentation 300 includes a first period 301 (e.g., PERIOD 1) and a second period 310 (e.g., PERIOD 2) corresponding to the first period 201 and the second period 210 in FIG. 2. The second period 310 may include a first adaptation set 320 of video component and a second adaptation set 321 of audio component or video component, and the like. The description of these structures in FIG. 3 that are the same or similar to those in FIG. 2 has been provided above and will be omitted here for clarity purposes. However, the first adaptation set 320 in the media presentation 300 has different structures from the first adaptation set 220 in the media presentation 200.

Specifically, the first adaptation set 320 corresponds to video content of a surface, such as a sphere surface, a 2D plane, and the like. The surface is partitioned into a plurality of sub-picture regions that can be overlapping or non-overlapping. The first adaptation set 320 includes a plurality of representations, such as a first representation 330, a second representation 350, and the like that have different coverage in spatial domain.

Further, each representation includes sub-representations for sub-picture regions. For example, the first representation 330 includes sub-representation 1.1 332 and sub-representation 1.2 333 for different sub-picture regions, and the second representation 350 includes sub-representation 2.1 352 and the sub-representation 2.2 353 for different sub-picture regions. The sub-representation 1.1 332 can include segment information 340 for a first segment stream, segment initialization information 371, a first segment information 372 for a first segment in the first segment stream, a second segment information 373 for a second segment in the first segment stream, and the like. In the embodiment, the projection based SRD can be used to signal spatial characteristics (e.g., locations, dependencies and the like) of the sub-picture regions at the sub-representation level.

Figure 4:
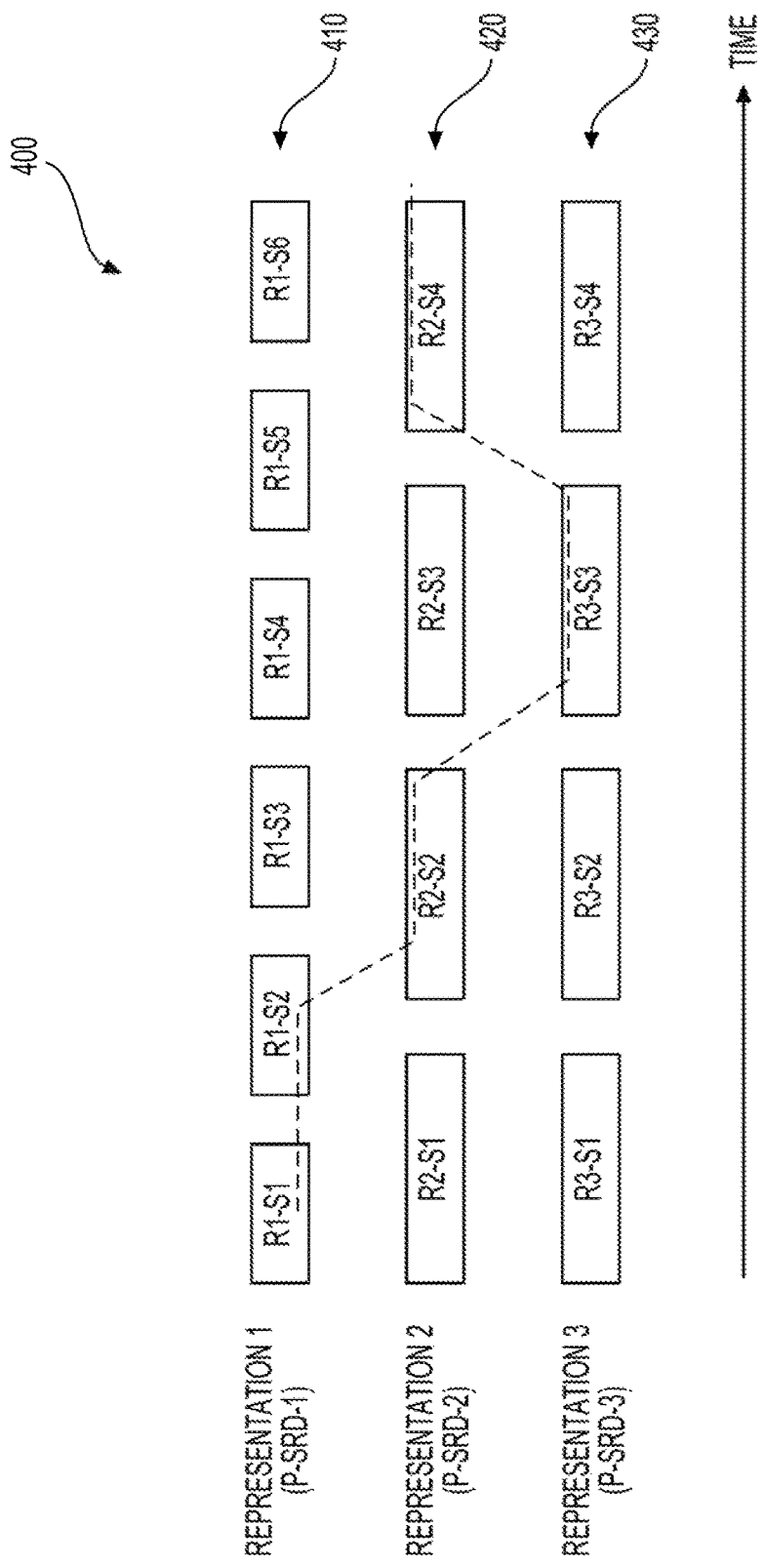
FIG. 4 shows a diagram 400 illustrating a dynamic adaptive streaming example according to an embodiment of the disclosure.

FIG. 4 shows a diagram 400 illustrating a dynamic adaptive streaming example according to an embodiment of the disclosure. In an example, the rendering system 160 requests and receives a stream of video content according to the diagram 400.

The diagram 400 shows a first representation for a first segment stream 410, a second representation for a second segment stream 420 and a third representation for a third segment stream 430 of the video content with different coverage in spatial domain. In an example, the first segment stream 410 has a first resolution that is a relatively low resolution, and the first segment stream 410 covers a first region that is a relatively large region (e.g., the whole plane). The second segment stream 420 has a second resolution, and the second segment stream 420 covers a second region. The third segment stream 430 has the second resolution, and the third segment stream 430 covers a third region. In an example, the second resolution is higher than the first resolution. In an example, a MPD file, such as the MPD file in FIG. 11 is used to describe the information of the first segment stream 410, the second segment stream 420 and the third segment stream 430. For example, the first segment stream 410 corresponds to region 1, the second segment stream 420 corresponds to region 2, and the third segment stream 430 corresponds to region 3 in the FIG. 11 example.

In the FIG. 4 example, the first segment stream 410 includes a first plurality of segments R1-S1 to R1-S6, the second segment stream 420 includes a second plurality of segments R2-S1 to R2-S4, and the third segment stream 430 includes a third plurality of segments R3-S1 to R3-S4.

During operation, in an example, the rendering system 160 receives a MPD file, such as the MPD file in FIG. 11. The MPD file includes projection based SRD (e.g., P-SRD-1) for region 1, projection based SRD (e.g., P-SRD-2) for region 2, and projection based SRD (e.g., P-SRD-3) for region 3. In the example, initially, the rendering system 160 requests and receives segments in the first segment stream 410, such as R1-S1, R1-S2. The segments in the first segment stream 410 have low nitrate and occupy a relatively low bandwidth. Images generated based on the segments in the first segment stream 410 have a relatively low resolution.

Then, the rendering system 160 detects that higher bandwidth is available. The rendering system 160 detects that the region of interests is in the second sub-picture region. Thus, based on the P-SRD-2, the rendering system 160 selects the second segment stream 420 and then requests and receives segments in the second segment stream 420, such as R2-S2, and generates images based on for example the segment R2-S2. Further, the rendering system 160 detects a change of region of interests from the second sub-picture region to the third sub-picture region. Thus, based on the P-SRD-3, the rendering system 160 reselects the third segment stream 430, and then requests and receives segments of the third segment stream 430, such as R3-S3, and generates images based on for example the segment R3-S3.

Figure 5:
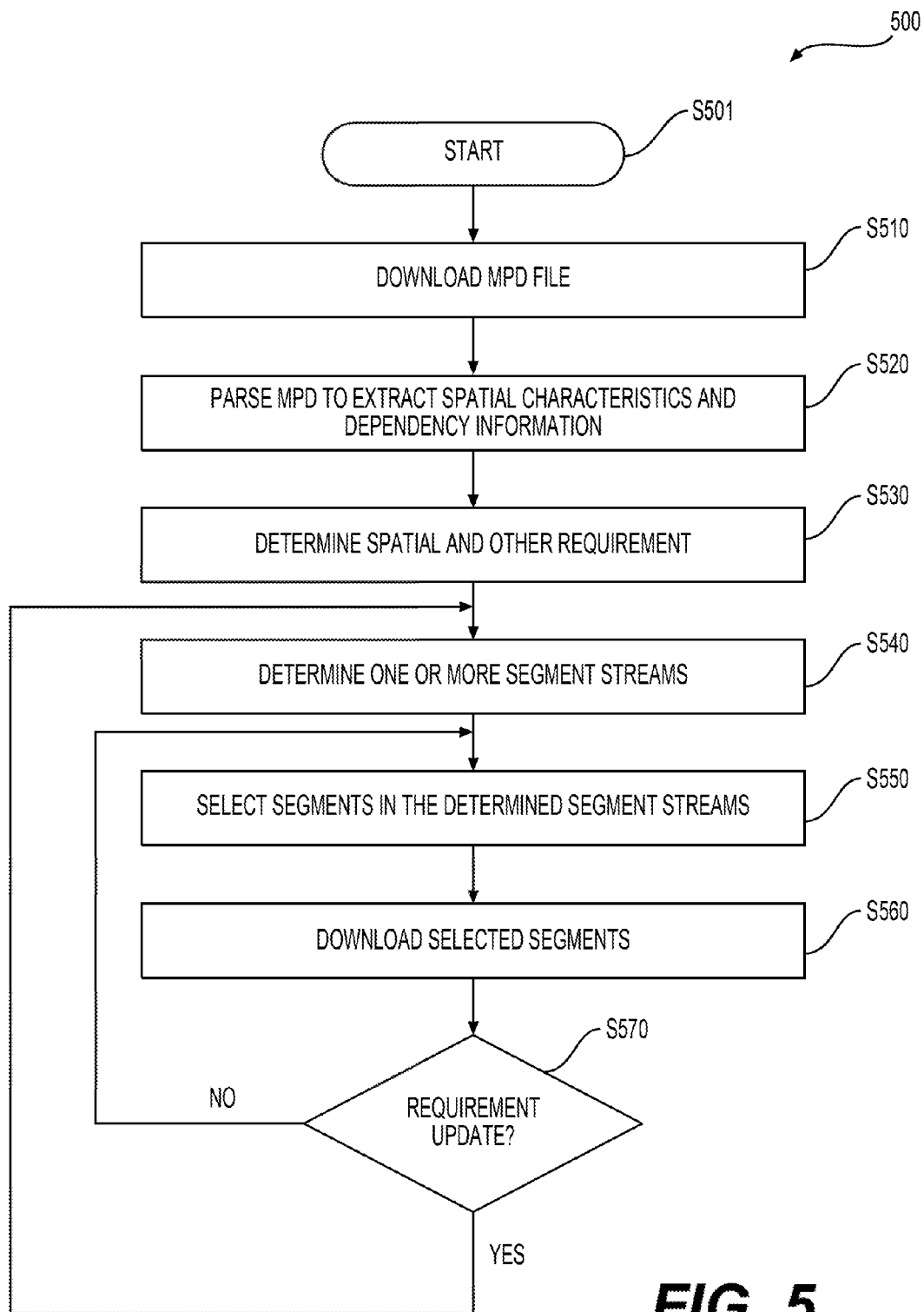
FIG. 5 shows a flow chart outlining a process example 500 according to an embodiment of the disclosure.

FIG. 5 shows a flow chart outlining a process example 500 according to an embodiment of the disclosure. In an example, the process 500 is executed by the rendering system 160 according to an embodiment of the disclosure. The process starts at S501 and proceeds to S510.

At S510, a MPD file is downloaded. In an example, the rendering system 160 downloads the MPD file 142 from the HTTP server 140.

At S520, the MPD file is parsed and various information, such as spatial characteristic information is extracted. In an example, the rendering system 160 extracts projection based SRD, dependency information, and the like for sub-picture regions.

At S530, spatial requirement (e.g., region of interests) and other requirement, such as bitrate requirement, are determined. In an example, the rendering system 160 determines an initial bitrate and an initial region of interest.

At S540, one or more segment streams are determined to satisfy the spatial requirement and the other requirement. In an example, the rendering system 160 selects one or more sub-picture regions with geometry information satisfying the spatial requirement based on the projection bases SRD and dependency information of the sub-picture regions. Then the rendering system 160 selects one of the representations for a selected sub-picture region that satisfies the bitrate requirement. The selected representation corresponds to a segment stream, and includes segment information (e.g., timing information, URL address information) of segments in the segment stream.

At S550, segments are selected from the determined segment streams. In an example, the rendering system 160 selects the segments based on time.

At S560, the selected segments are downloaded. In an example, the rendering system 160 downloads the selected segments from the HTTP server 140 based on the URL addresses of the selected segments. Then, images are generated based on the downloaded segments.

At S570, when one or more requirements are updated, the process returns to the S540 to determine segment streams based on the updated requirements; otherwise, the process returns to S550 to select segments from the determined segment streams. In an example, the rendering system 160 detects a change in network traffic status, and updates a bitrate requirement, thus the process returns to S540. In another example, the rendering system 160 detects a change in the region of interests, and updates a spatial requirement, thus the process returns to S540. In another example, the rendering system 160 updates a time period, and the process returns to S540.

Figure 6:
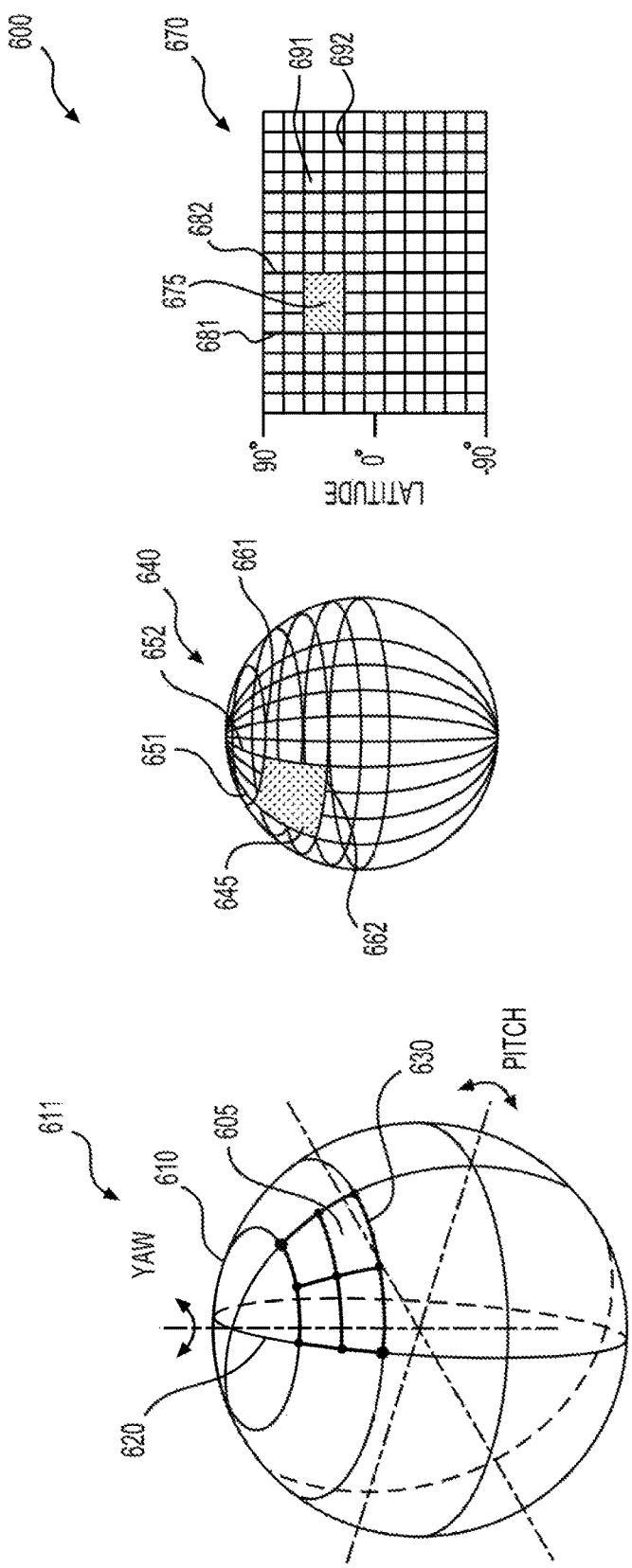
FIG. 6 shows a plot 600 illustrating equirectangular projection (ERP) according to an embodiment of the disclosure.

FIG. 6 shows a plot 600 illustrating ERP projection according to an embodiment of the disclosure. The plot 600 shows a sphere 611 with a sphere surface 610. The sphere surface 610 (e.g., earth surface) uses spherical coordinate system of yaw (e.g., longitude direction) and pitch (e.g., latitude direction). In the FIG. 6 example, boundaries of a region 605 on the sphere surface 610 are formed by yaw circles 620 (e.g., longitude lines) and pitch circles 630 (e.g., latitude lines).

Further, FIG. 6 shows an ERP projection from a sphere surface 640 to a 2D plane 670. In the example, the sphere surface 640 uses a spherical coordinate system of yaw and pitch. In the example, the sphere surface 640 is referenced with yaw circles (e.g., yaw circle 651, yaw circle 652), and pitch circles (e.g., pitch circle 661, pitch circle 662). The 2D plane 670 uses XY coordinate system, and is referenced with vertical lines and horizontal lines. In the FIG. 6 example, X-axis corresponds to longitude and Y-axis corresponds to latitude.

The ERP projection projects a sphere surface to a 2D plane in a similar manner as projecting earth surface to a map. During the projection, the yaw circles are transformed to the vertical lines and the pitch circles are transformed to the horizontal lines, the yaw circles and the pitch circles are orthogonal in the spherical coordinate system, and the vertical lines and the horizontal lines are orthogonal in the XY coordinate system. Thus, the sphere surface is projected into a rectangle in the 2D plane 670. In an example, points in the rectangle have yaw coordinates in the range of [0, 360], and pitch coordinates in the range of [−90, 90].

In the FIG. 6 example, a region of interests 645 on the sphere surface 640 is projected to a region of interests 675 on the 2D plane 670. In the FIG. 6 example, the boundaries of the region of interests 645 on the sphere surface 640 are the yaw circles 651-652 and the pitch circles 661-662. The yaw circles 651-652 are projected to the 2D plane 670 as the vertical lines 681-682, and the pitch circles 661-662 are projected to the 2D plane 670 as the horizontal lines 691-692.

Figure 7:
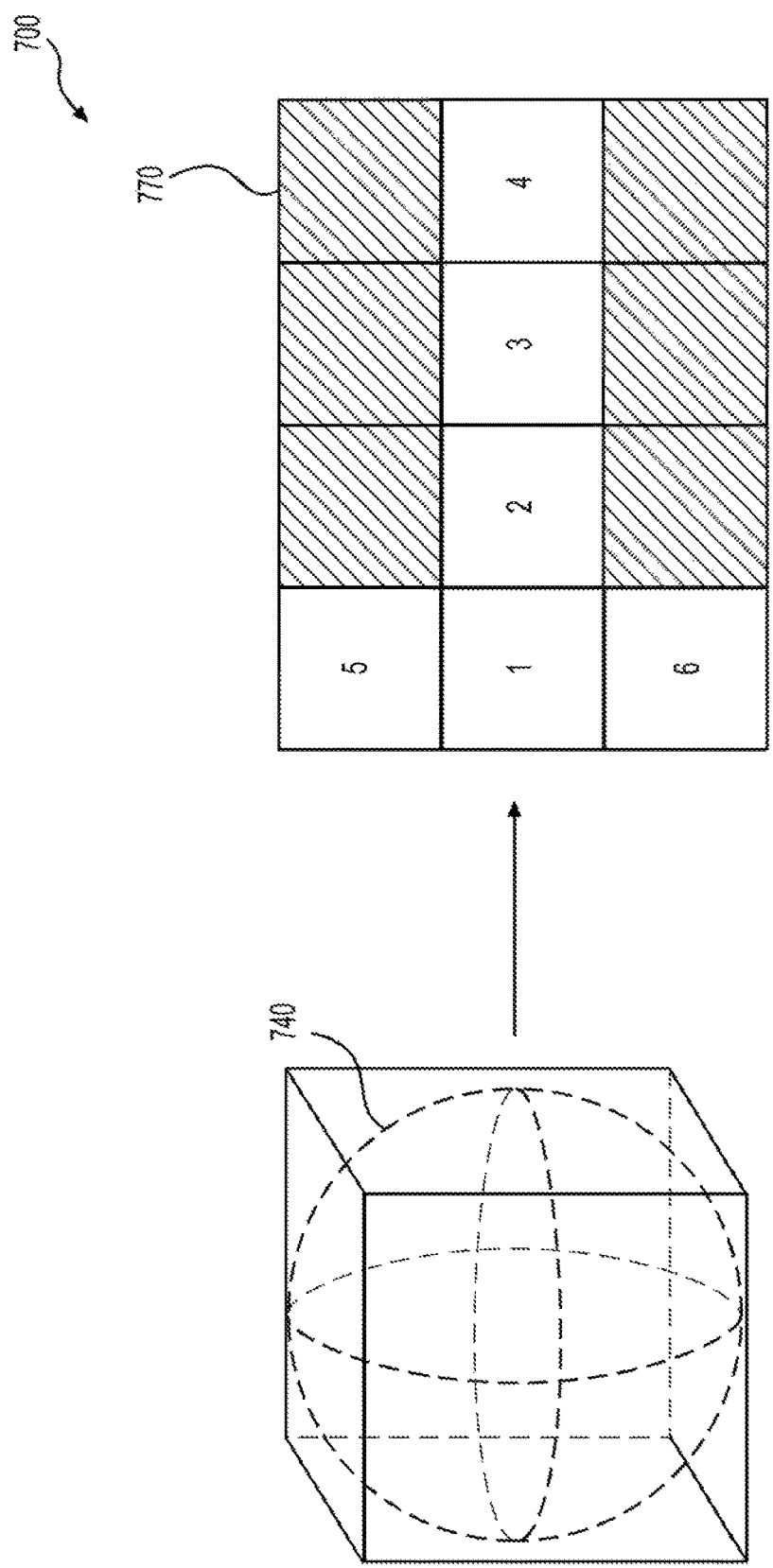
FIG. 7 shows a plot 700 illustrating an example of platonic solid projection according to an embodiment of the disclosure.

FIG. 7 shows a plot 700 illustrating an example of platonic solid projection according to an embodiment of the disclosure. In the FIG. 7 example, a sphere surface 740 is projected to faces (e.g., 1-6) of a cube. The faces of the cube are arranged in a 2D plane 770. In an example, dummy faces (e.g., shaded faces) are added in the 2D plane 770 as shown in FIG. 7.

FIG. 8 shows a table 800 of parameters that are used in projection based SRD according to an embodiment of the disclosure. The table 800 includes 3 columns 810-830. The column 810 provides names of the parameters in the projection based SRD, the column 820 provides use types of the parameters, and column 830 provides descriptions of the parameters.

In the FIG. 8 example, the parameter GEOMETRY_TYPE is used as a projection identifier to identify whether projection is used and what kind of projection is used. For example, when the parameter GEOMETRY_TYPE has value "0", projection is not used and the projection based SRD is defined in the same manner as a conventional Euclidean geometry SRD. In an example, the conventional Euclidean geometry SRD uses parameters OBJECT_X, OBJECT_Y, OBJECT_WIDTH, and OBJECT_HEIGHT to define a rectangular region. In the example, the parameters OBJECT_X and OBJECT_Y provide coordinates of a corner point, such as the top-left corner of the rectangular region. The parameter OBJECT_WIDTH provides the width of the rectangular region, and the parameter OBJECT_HEIGHT provides the height of the rectangular region.

Further, when the parameter GEOMETRY_TYPE has value "1", ERP projection is used, and the projection based SRD uses a sphere geometry coordinate system. In the FIG. 8 example, parameters REGION_YAW_MIN, REGION_YAW_MAX, REGION_PITCH_MIN, and REGION_PITCH_MAX are used to define a rectangular region when the parameter GEOMETRY_TYPE has value "1". The parameter REGION_YAW_MIN provides the minimum yaw value of the rectangular region, the parameter REGION_YAW_MAX provides the maximum yaw value of the rectangular region, the parameter REGION_PITCH_MIN provides the minimum pitch value of the rectangular region, and the parameter REGION_PITCH_MAX provides the maximum pitch value of the rectangular region. It is noted that other set of parameters can be used to define the rectangular region. For example, the rectangular region can be defined by yaw and pitch values of a corner point, a width in yaw and a height in pitch.

In the FIG. 8 example, when the parameter GEOMETRY_ TYPE has value "1", the projection based SRD can include optional parameters, such as parameters TOTAL_YAW_MIN, TOTAL_YAW_MAX, TOTAL_PITCH_MIN, and TOTAL_PITCH_MAX. For example, when an omnidirectional image has less than 360°, the parameters TOTAL_YAW_MIN, TOTAL_YAW_MAX, TOTAL_PITCH_MIN and TOTAL_PITCH_MAX can be used to provide the dimensions of the omnidirectional image.

Further, when the parameter GEOMETRY_TYPE has value "2", platonic solid projection is used, and the projection based SRD uses a face index system. In the FIG. 8 example, parameters REGION_FACE, and TOTAL_FACE are used to define a region which is a face of a platonic solid when the parameter GEOMETRY_TYPE has value "2". The parameter TOTAL_FACE provides the number of faces for the platonic solid, and the parameter REGION_FACE provides the index for the face.

Figure 9:
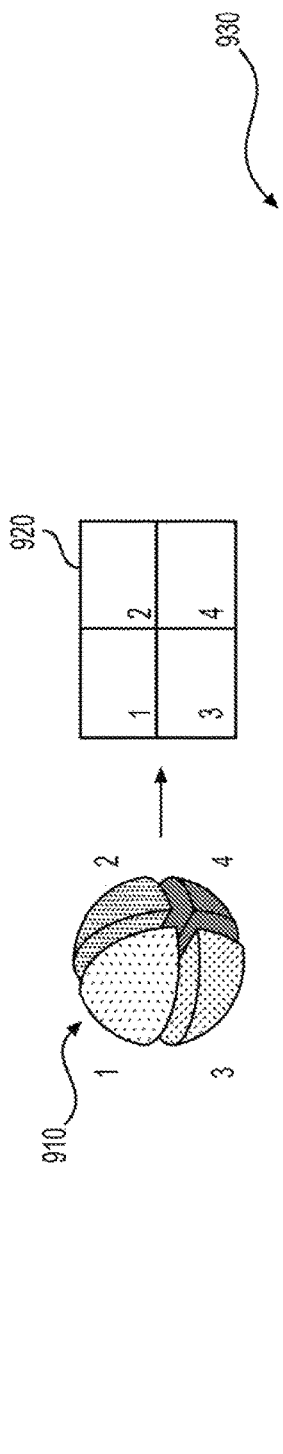

FIG. 9 shows an example of an MPD file 930 that uses projection based SRD at an adaptation set level to provide spatial information according to an embodiment of the disclosure.

In the FIG. 9 example, video content of a sphere surface 910 is projected into a rectangle in a 2D plane 920 according to ERP projection. The rectangle in 2D plane 920 is divided into four regions 1-4. The MPD file 930 provides description for the video content in the 2D plane 920, and uses projection based SRD to provide spatial information.

The MPD file 930 includes adaptation sets corresponding to regions, and includes projection based SRD at the adaptation set level to provide spatial information for the regions. For example, value 931 at the adaptation set level provides spatial information for region 1, and value 934 at the adaptation set level provides spatial information for region 4 based on the projection based SRD.

In an example, the processing circuit 170 can parse the MPD file 930 to extract the value 931 for region 1. Further, the processing circuit 170 can parse the value 931 to determine the spatial information of region 1. For example, the processing circuit 170 determines that parameter SOURCE_ID has the value "0" and the parameter GEOMETRY_TYPE has the value "1". Thus, the processing circuit 170 determines that the ERP projection is used, and the region 1 is defined using a sphere geometry coordinate system, such as using the parameters REGION_YAW_MIN, REGION_YAW_MAX, REGION_PITCH_MIN, and REGION_PITCH_MAX. Then, according to the value 931, the processing circuit 170 determines that the parameter REGION_YAW_MIN has the value "0", the parameter REGION_YAW_MAX has the value "180", the parameter REGION_PITCH_MIN has the value "0", and the parameter REGION_PITCH_MAX has the value "90".

Similarly, according to the value 934, the processing circuit 170 determines that, for the region 4, the parameter REGION_YAW_MIN has the value "180", the parameter REGION_YAW_MAX has the value "360", the parameter REGION_PITCH_MIN has the value "−90", and the parameter REGION_PITCH_MAX has the value "0".

Figure 10:
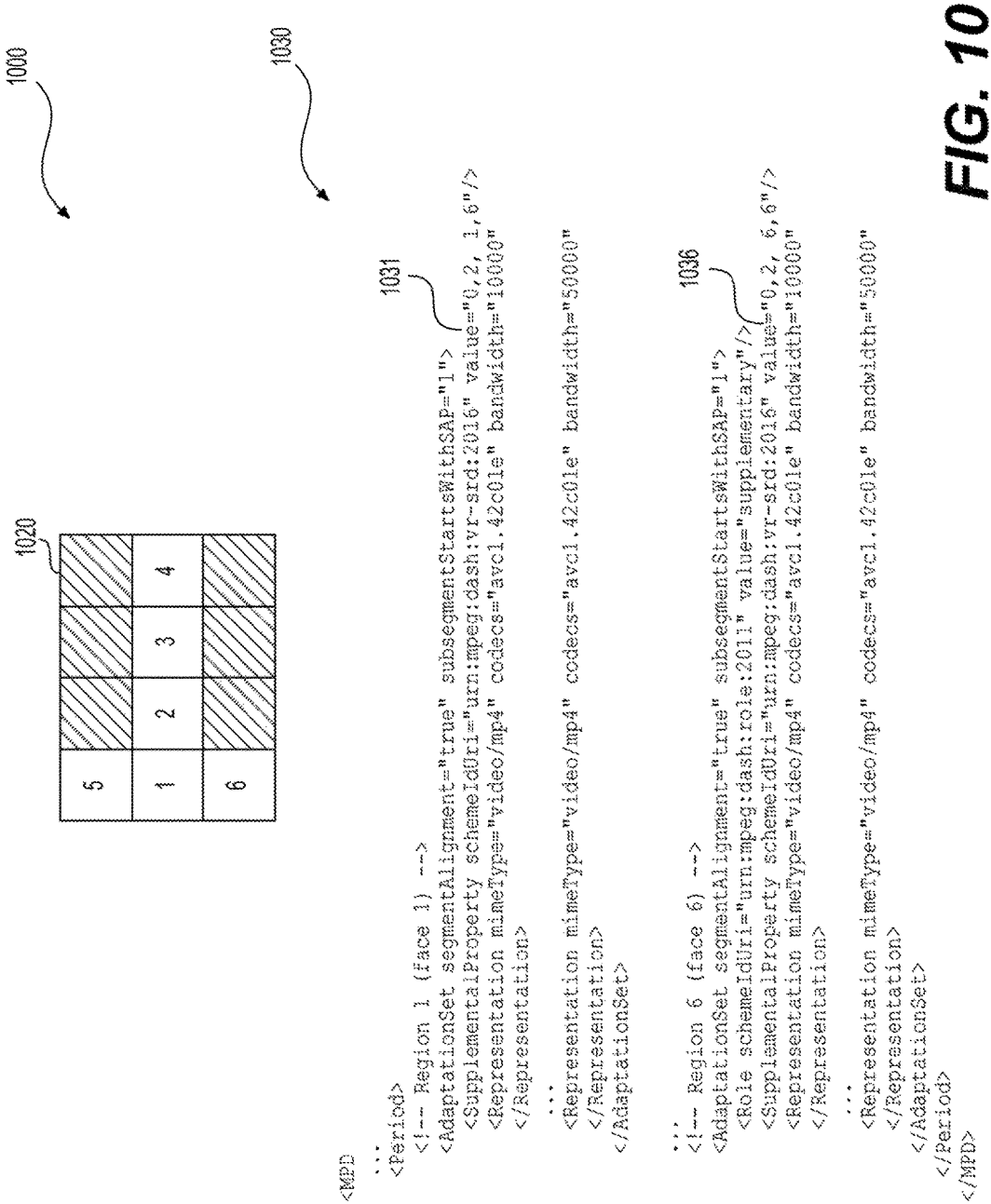

FIG. 10 shows an example 1000 of an MPD file 1030 that uses projection based SRD at the adaptation set level to provide spatial information according to an embodiment of the disclosure.

In the FIG. 10 example, video content of a sphere surface is projected to faces 1-6 of a cube. The faces 1-6 are rearranged into a 2D plane 1020. The MPD file 1030 provides description for the video content in the 2D plane 1020, and uses projection based SRD to provide spatial information.

The MPD file 1030 includes adaptation sets corresponding to regions, such as faces in the FIG. 10 example, and includes projection based SRD at the adaptation set level to provide spatial information for the faces. For example, value 1031 at the adaptation set level provides spatial information for the face 1, and value 1036 at the adaptation set level provides spatial information for the face 6 based on the projection based SRD.

In an example, the processing circuit 170 can parse the MPD file 1030 to extract the value 1031 for face 1. Further, the processing circuit 170 can parse the value 1031 to determine the spatial information for the face 1. For example, the processing circuit 170 determines that parameter SOURCE_ID has the value "0" and the parameter GEOMETRY_TYPE has the value "2". Thus, the processing circuit 170 determines that the platonic solid projection is used, and the face 1 is defined using a sphere geometry coordinate system, such as using the parameters REGION_FACE, and TOTAL_FACE. Then, according to the value 1031, the processing circuit 170 determines that the parameter REGION_FACE has the value "1", the parameter TOTAL_FACE has the value "6" that is indicative of a cube projection.

Similarly, according to the value 1036, the processing circuit 170 determines that, for the face 6, the parameter REGION_FACE has the value "6".

FIG. 11 shows an example of an MPD file 1140 that uses projection based SRD at the adaptation set level to provide spatial information for multi-resolution and multi-partition scenario according to an embodiment of the disclosure.

In the FIG. 11 example, video content of a sphere surface is projected to a 2D plane according to ERP projection. The video content in the 2D plane is processed, such as downsampled to generate multiple resolution frames, such as a first rectangular frame 1110 of 480×270 pixels, a second rectangular frame 1120 of 960×540 pixels and a third rectangular frame 1130 of 1920×1080 pixels. In an example, the rectangular frames are partitioned into regions, for example, to have about the same number of pixels. In the FIG. 11 example, the first rectangular frame 1110 is partitioned into region 1, the second rectangular frame 1120 is partitioned into regions 2-5, and the third rectangular frame 1130 is partitioned into regions 6-21. The MPD file 1140 provides description for the video content in the rectangular frames 1110-1130, and uses projection based SRD to provide spatial information.

The MPD file 1140 includes adaptation sets corresponding to regions, and includes projection based SRD at the adaptation set level to provide spatial information for the regions. For example, value 1141 at the adaptation set level provides spatial information for the region 1, and value 1142 at the adaptation set level provides spatial information for the region 2, value 1146 at the adaptation set level provides spatial information for the region 6, and value 1161 at the adaptation set level provides spatial information for the region 21 based on the projection based SRD.

In an example, the processing circuit 170 can parse the MPD file 1140 to extract the value 1141 for region 1. Further, the processing circuit 170 can parse the value 1141 to determine the spatial information of the region 1. For example, the processing circuit 170 determines that parameter SOURCE_ID has the value "0" and the parameter GEOMETRY_TYPE has the value "1". Thus, the processing circuit 170 determines that the projection is the ERP projection is used, and the region 1 is defined using a sphere geometry coordinate system, such as using the parameters REGION_YAW_MIN, REGION_YAW_MAX, REGION_PITCH_MIN, and REGION_PITCH_MAX. Then, according to the value 1141, the processing circuit 170 determines that the parameter REGION_YAW_MIN has the value "0", the parameter REGION_YAW_MAX has the value "360", the parameter REGION_PITCH_MIN has the value "−90", and the parameter REGION_PITCH_MAX has the value "90".

Further, the processing circuit 170 determines that optional parameters TOTAL_YAW_MIN, TOTAL_YAW_MAX, TOTAL_PITCH_MIN, and TOTAL_PITCH_MAX are used in the value 1141. Then, according to the value 1141, the processing circuit 170 determines that the parameter TOTAL_YAW_MIN has the value "0", the parameter TOTAL_YAW_MAX has the value "360", the parameter TOTAL_PITCH_MIN has the value "−90", and the parameter TOTAL_PITCH_MAX has the value "90".

Similarly, according to the value 1142, the processing circuit 170 determines that, for the region 2, the parameter REGION_YAW_MIN has the value "0", the parameter REGION_YAW_MAX has the value "180", the parameter REGION_PITCH_MIN has the value "0", the parameter REGION_PITCH_MAX has the value "90", the parameter TOTAL_YAW_MIN has the value "0", the parameter TOTAL_YAW_MAX has the value "360", the parameter TOTAL_PITCH_MIN has the value "−90", and the parameter TOTAL_PITCH_MAX has the value "90".

Similarly, according to the value 1146, the processing circuit 170 determines that, for the region 6, the parameter REGION_YAW_MIN has the value "0", the parameter REGION_YAW_MAX has the value "90", the parameter REGION_PITCH_MIN has the value "45", the parameter REGION_PITCH_MAX has the value "90", the parameter TOTAL_YAW_MIN has the value "0", the parameter TOTAL_YAW_MAX has the value "360", the parameter TOTAL_PITCH_MIN has the value "−90", and the parameter TOTAL_PITCH_MAX has the value "90".

Similarly, according to the value 1161, the processing circuit 170 determines that, for the region 21, the parameter REGION_YAW_MIN has the value "270", the parameter REGION_YAW_MAX has the value "360", the parameter REGION_PITCH_MIN has the value "−90", the parameter REGION_PITCH_MAX has the value "−45", the parameter TOTAL_YAW_MIN has the value "0", the parameter TOTAL_YAW_MAX has the value "360", the parameter TOTAL_PITCH_MIN has the value "−90", and the parameter TOTAL_PITCH_MAX has the value "90".

In an example, the processing circuit 170 can determine the suitable segment streams to request based on the projection based SRD and other information in the MPD file to meet spatial requirement and other requirement. For example, the processing circuit 170 determines a region of interest (dark rectangles in the rectangular frame 1110, the rectangular frame 1120, the rectangular frame 1130). Then, depending on resolution requirement, the processing circuit 170 can select a segment stream of region 1, or a segment stream of region 3 or segment streams of regions 8 and 12.

Figure 12:
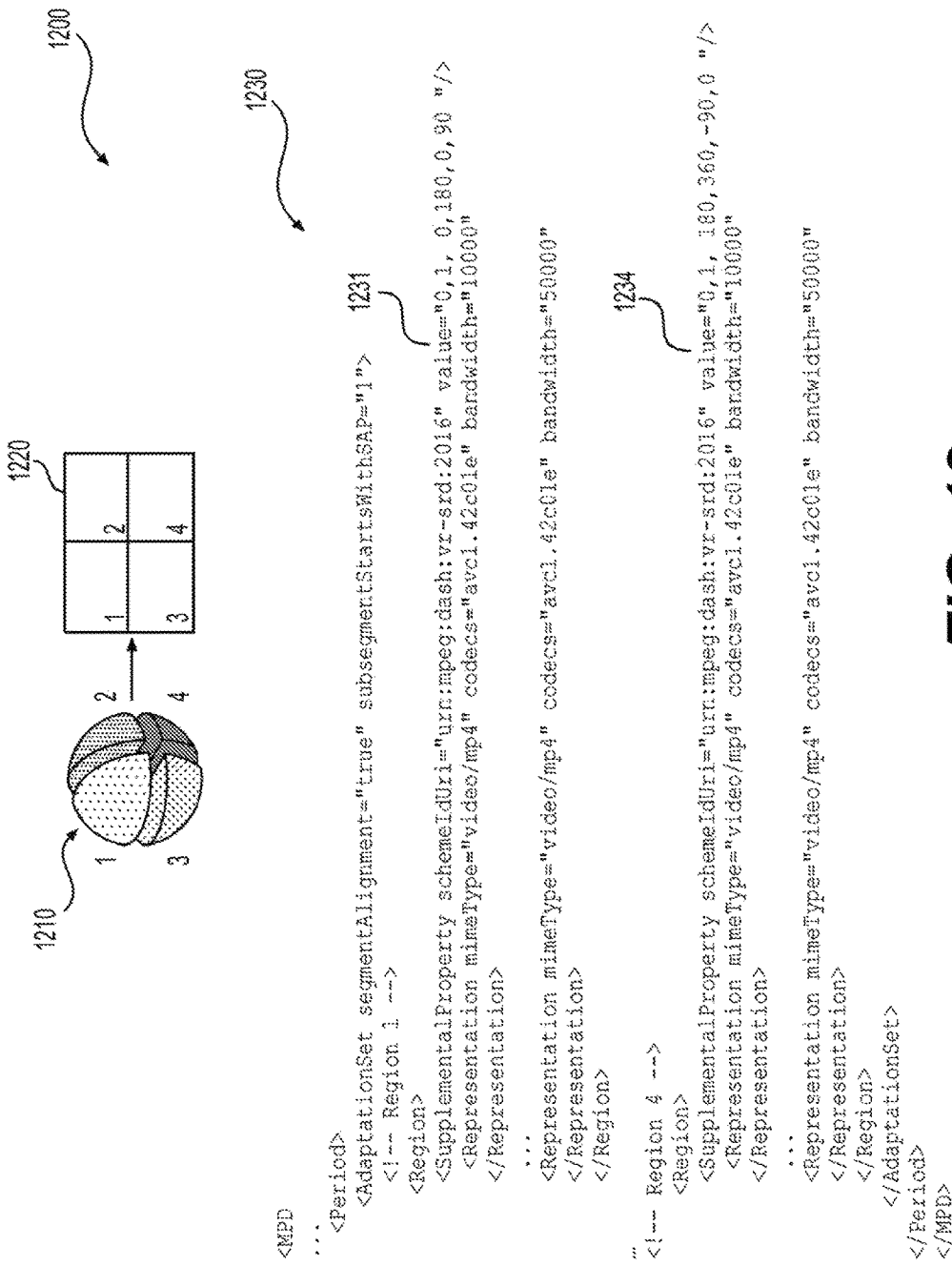

FIG. 12 shows an example 1200 of a media presentation description (MPD) file 1230 that uses projection based SRD at the representation level to provide spatial information according to an embodiment of the disclosure.

In the FIG. 12 example, video content of a sphere surface 1210 is projected into a rectangle in a 2D plane 1220 according to ERP projection. The rectangle in the 2D plane 1220 is divided into four regions 1-4. The MPD file 1230 provides description for the video content in the 2D plane 1220, and uses projection based SRD to provide spatial information.

The MPD file 1230 includes an adaptation set for video content. The adaptation set includes a plurality of representations. The representations are grouped according to regions. For example, representations for region 1 are grouped together, and representations for region 4 are grouped together. In the FIG. 12 example, the representations for a region are alternative representations for different bandwidths. A group of representations for a region includes projection based SRD at the representation level to provide spatial information for the region. For example, value 1231 at the representation level provides spatial information for the group of representations of the region 1, and value 1234 at the representation level provides spatial information for the group of representations of the region 4 based on the projection based SRD.

In an example, the processing circuit 170 can parse the MPD file 1230 to extract the value 1231 for the region 1 at the representation level. Further, the processing circuit 170 can parse the value 1231 to determine the spatial information of the set of representations of the region 1. For example, the processing circuit 170 determines that parameter SOURCE_ID has the value "0" and the parameter GEOMETRY_TYPE has the value "1". Thus, the processing circuit 170 determines that the projection is the ERP projection is used, and the region 1 is defined using a sphere geometry coordinate system, such as using the parameters REGION_YAW_MIN, REGION_YAW_MAX, REGION_PITCH_MIN, and REGION_PITCH_MAX. Then, according to the value 1231, the processing circuit 170 determines that the parameter REGION_YAW_MIN has the value "0", the parameter REGION_YAW_MAX has the value "180", the parameter REGION_PITCH_MIN has the value "0", and the parameter. REGION_PITCH_MAX has the value "90".

Similarly, according to the value 1234, the processing circuit 170 determines that, for the region 4, the parameter REGION_YAW_MIN has the value "180", the parameter REGION_YAW_MAX has the value "360", the parameter REGION_PITCH_MIN has the value "−90", and the parameter REGION_PITCH_MAX has the value "0".

It is noted that the MPD file 1230 can be suitably modified to provide spatial information for the platonic solid projection example at the representation level and can be suitably modified to provide spatial information for the multi-resolution and multi-partition example at the representation level.

Figure 13:
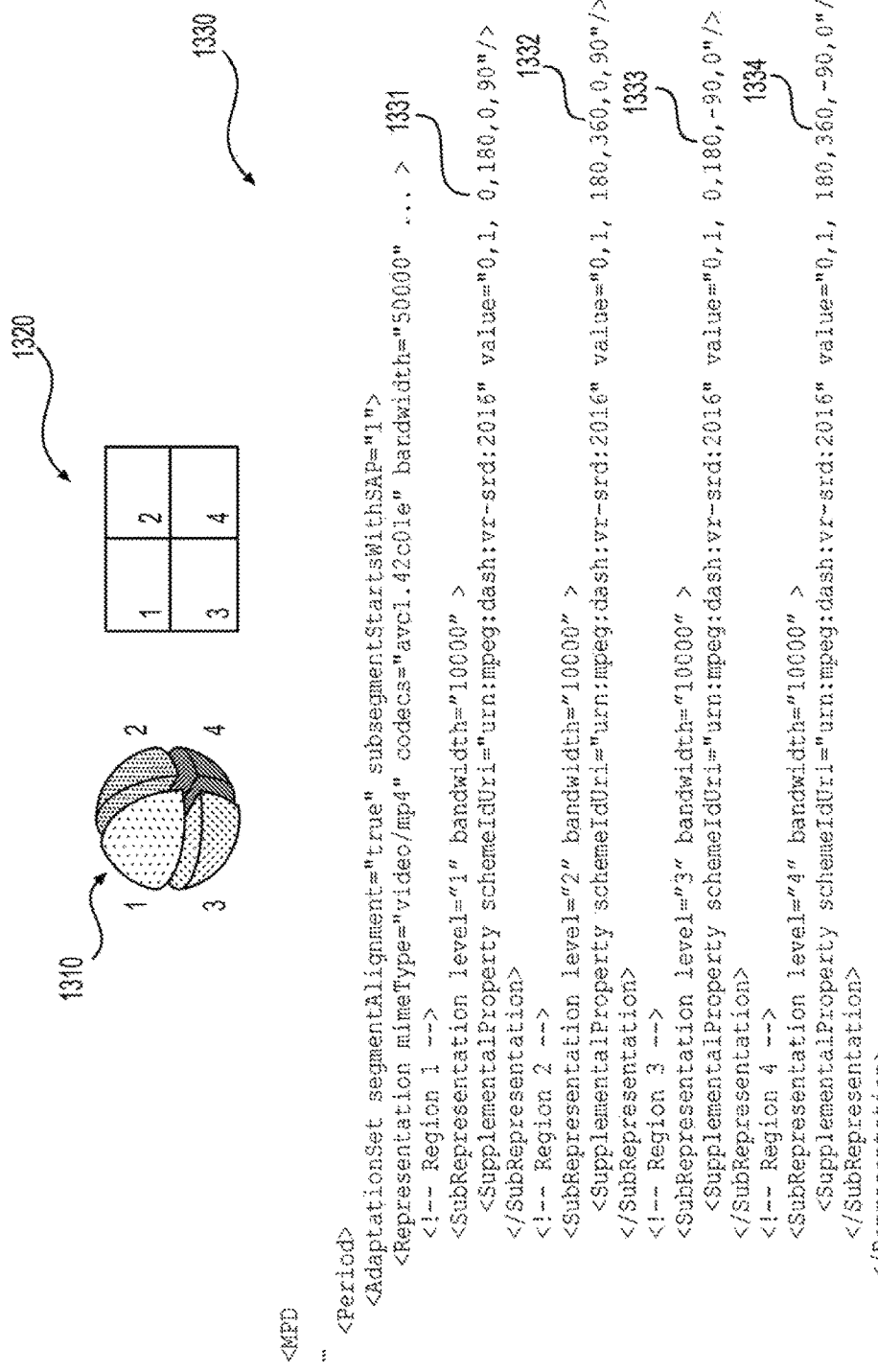

FIG. 13 shows an example of an MPD file 1330 that uses projection based SRD at the sub-representation level to provide spatial information according to an embodiment of the disclosure.

In the FIG. 13 example, video content of a sphere surface 1310 is projected into a rectangle in a 2D plane 1320 according to ERP projection. The rectangle in the 2D plane 1320 is divided into four regions 1-4. The MPD file 1330 provides description for the video content in the 2D plane 1320, and uses projection based SRD to provide spatial information description.

The MPD file 1330 includes an adaptation set for video content. The adaptation set includes one or more representations of the video content. A representation includes sub-representations corresponding to regions. A sub-representation corresponding to a region includes projection based SRD at the sub-representation level to provide spatial information for the region. For example, value 1331 at the sub-representation level provides spatial information for the region 1, value 1332 at the sub-representation level provides spatial information for the region 2, value 1333 at the sub-representation level provides spatial information for the region 3, and value 1334 at the sub-representation level provides spatial information for the region 4 based on the projection based SRD.

In an example, the processing circuit 170 can parse the MPD file 1330 to extract the value 1331 for region 1. Further, the processing circuit 170 can parse the value 1331 to determine the spatial information of the region 1. For example, the processing circuit 170 determines that parameter SOURCE_ID has the value "0" and the parameter GEOMETRY_TYPE has the value "1". Thus, the processing circuit 170 determines that the projection is the ERP projection is used, and the region 1 is defined using a sphere geometry coordinate system, such as using the parameters REGION_YAW_MIN, REGION_YAW_MAX, REGION_PITCH_MIN, and REGION_PITCH_MAX. Then, according to the value 1331, the processing circuit 170 determines that the parameter REGION_YAW_MIN has the value "0", the parameter REGION_YAW_MAX has the value "180", the parameter REGION_PITCH_MIN has the value "0", and the parameter REGION_PITCH_MAX has the value "90".

Similarly, according to the value 1332, the processing circuit 170 determines that, for the region 2, the parameter REGION_YAW_MIN has the value "180", the parameter REGION_YAW_MAX has the value "360", the parameter REGION_PITCH_MIN has the value "0", and the parameter REGION_PITCH_MAX has the value "90".

Similarly, according to the value 1333, the processing circuit 170 determines that, for the region 3, the parameter REGION_YAW_MIN has the value "0", the parameter REGION_YAW_MAX has the value "180", the parameter REGION_PITCH_MIN has the value "−90", and the parameter REGION_PITCH_MAX has the value "0".

Similarly, according to the value 1334, the processing circuit 170 determines that, for the region 4, the parameter REGION_YAW_MIN has the value "180", the parameter REGION_YAW_MAX has the value "360", the parameter REGION_PITCH_MIN has the value "−90", and the parameter REGION_PITCH_MAX has the value "0".

It is noted that the MPD file 1330 can be suitably modified to provide spatial information for the platonic solid projection example at the sub-representation level and can be suitably modified to provide spatial information for the multi-resolution and multi-partition example at the sub-representation level.

FIG. 14 shows an example of an MPD file 1400 having region dependency information according to an embodiment of the disclosure.

The MPD file 1400 is similar to the MPD file 1230 that includes projection based SRD at the representation level to provide spatial information for the regions. Further, in the MPD file 1400 includes region dependency information. For example, the representation "r2_1" of the region 2 depends on the representation "r1_1" of the region 1 as shown by 1410; the representation "r2_3" of the region 2 depends on the representation "r1_3" of the region 1 as shown by 1420; the representation "r4_1" of the region 4 depends on the representation "r3_1" of the region 3 as shown by 1430; the representation "r4_3" of the region 4 depends on the representation "r3_3" of the region 1 as shown by 1440.

In an example, the video content of region 2 and the video content of region 1 are similar. The processing circuit 120 calculates the video content difference of region 2 to region 1, and encodes the video content difference in the segment stream for the region 2. For example, the representation "r1_1" corresponds to a segment stream of video content of region 1, and the representation "r2_1" corresponds to a segment stream of video content difference of region 2 to region 1. The processing circuit 120 includes the region dependency information in the MPD file 1400.

In the example, the processing circuit 170 processes the MPD file 1400, extracts the region dependency information, and uses the region dependency information during video rendering process. For example, when the region of interest is within region 2, due to the dependency relationship of the representation "r2_1" to the representation "r1_1", the processing circuit 170 can select both of the segment streams corresponding to the representation "r2_1" to the representation "r1_1", and request segments in both segment streams. Then, the processing circuit 170 can render video content in region 2 based on the video content in region 1 and the video content difference of region 2 to region 1.

FIG. 15 shows an example of an MPD file 1500 having bandwidth dependency according to an embodiment of the disclosure.

The MPD file 1500 is similar to the MPD 1230 that includes projection based SRD at the representation level to provide spatial information for the regions. Further, in the MPD file 1500 includes bandwidth dependency information between representations of the same region under different bandwidths. For example, the representation "r1_1" and the representation "r1_3" are alternative representations for region 1 under different bandwidths. The representation "r1_3" depends on the representation "r1_1" as shown by 1510. Similarly, the representation "r2_3" of the region 2 depends on the representation "r2_1" of the region 2 as shown by 1520; the representation "r3_3" of the region 3 depends on the representation "r3_1" of the region 3 as shown by 1530; the representation "r4_3" of the region 4 depends on the representation "r4_1" of the region 4 as shown by 1540.

In the FIG. 15 example, the representation of high bandwidth depends on the representation of low bandwidth for the same region. In an example, the processing circuit 120 calculates the video content difference of different bandwidths for the same region, and encodes the video content difference in the segment stream for the high bandwidth. For example, the representation "r1_1" corresponds to a segment stream of video content of region 1 of the low bandwidth, and the representation "r1_3" corresponds to a segment stream of video content difference between the high bandwidth to the low bandwidth for region 1. The processing circuit 120 includes the dependency information of the representation "r1_3" to the representation "r1_1" in the MPD file 1500.

In the example, processing circuit 170 processes the MPD file 1400, extracts the dependency information, and use the dependency information during video rendering process. For example, the region of interest is region 1, initially the processing circuit 170 selects the segment stream corresponding to the representation "r1_1". When higher bandwidth is available, in an example, due to the dependency relationship of the representation "r1_3" to the representation "r1_1", the processing circuit 170 can select both of the segment streams corresponding to the representation "r1_3" to the representation "r1_1", and request segments in both segment streams. Then, the processing circuit 170 can render video content of higher quality based on the video content of the low bandwidth and the video content difference between the high bandwidth and the low bandwidth.

FIG. 16 shows an example of an MPD file 1600 with image size dependency according to an embodiment of the disclosure.

The MPD file 1600 is similar to the MPD file 1230 that it eludes projection based SRD at the representation level to provide spatial information for the regions. Further, in the MPD file 1600 includes image size dependency information. For example, the representation "r1_2" and the representation "r1_1" are alternative representations for region 1 of different image sizes (e.g., width). The representation "r1_2" depends on the representation "r1_1" as shown by 1610. Similarly, the representation "r2_2" of the region 2 depends on the representation "r2_1" of the region 2 as shown by 1620; the representation "r3_2" of the region 3 depends on the representation "r3_1" of the region 3 as shown by 1630; the representation "r4_2" of the region 4 depends on the representation "r4_1" of the region 4 as shown by 1640.

In the FIG. 16 example, the representation of large image size depends on the representation of small image size for the same region. In an example, the processing circuit 120 calculates the video content difference of different image sizes for the same region, and encodes the video content difference in the segment stream of the large image size. For example, the representation "r1_1" corresponds to a segment stream of video content of region 1 of the small image size, and the representation "r1_2" corresponds to a segment stream of video content difference between the large image size to the small image size for region 1. The processing circuit 120 includes the dependency information of the representation "r1_2" to the representation "r1_1" in the MPD file 1600.

In the example, the processing circuit 170 processes the MPD file 1600, extracts the dependency information, and use the dependency information during video rendering process. For example, the region of interest is region 1, initially the processing circuit 170 selects the segment stream corresponding to the representation "r1_1". When large image size is requested, in an example, due to the dependency relationship of the representation "r1_2" to the representation "r1_1", the processing circuit 170 can select both of the segment streams corresponding to the representation "r1_2" to the representation "r1_1", and request segments in both segment streams. Then, the processing circuit 170 can render video content of large image size based on the video content of the small image size and the video content difference between the large image size and the small image size.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus, comprising:
    an interface circuit configured to receive media presentation description information of media data, the media data including video content on a two-dimensional (2D) plane that is projected from video content of a sphere surface according to a projection, the video content on the plane including a plurality of segment streams having different video coverage on the 2D plane, and the media presentation description information using projection based spatial relationship description (P-SRD) to describe the different video coverage by the video content on the 2D plane according to the projection;
    a processing circuit configured to determine one or more segment streams based on a region of interests for image generation and the P-SRD, select segments in the one or more segment streams, and cause the interface circuit to request and receive the selected segments; and
    a display device configured to display images generated based on the selected segments.

2. The apparatus of claim 1, wherein the processing circuit is configured to parse a projection indicator from the P-SRD.

3. The apparatus of claim 2, wherein the processing circuit is configured to parse yaw and pitch coordinates in a sphere coordinate system from the P-SRD when the projection indicator is indicative of an equirectangular projection (ERP).

4. The apparatus of claim 3, wherein the processing circuit is configured to parse a minimum value of yaw coordinate, a maximum value of yaw coordinate, a minimum value of pitch coordinate, and a maximum value of pitch coordinate from the projection based spatial relationship description that define a region in the 2D plane.

5. The apparatus of claim 3, wherein the processing circuit is configured to parse yaw and pitch coordinates that define a corner point of a rectangular region, and parse a width and a height of the rectangular region in yaw and pitch coordinates from the P-SRD.

6. The apparatus of claim 2, wherein the processing circuit is configured to parse one or more face indexes from the P-SRD when the projection indicator is indicative of a platonic solid projection.

7. The apparatus of claim 2, wherein the processing circuit is configured to parse coordinates in an Euclidean coordinate system from the projection based spatial relationship description when the projection indicator is indicative of no projection.

8. The apparatus of claim 1, wherein the media presentation description information uses the P-SRD in at least one of an adaptation set level, a representation level and a sub-representation level to describe the different video coverage in the 2D plane according to the projection.

9. The apparatus of claim 1, wherein the processing circuit is configured to parse the media presentation description information to extract a dependency of a first segment stream to a second segment stream, and select segments in the first segment stream and the second segment stream, and cause the interface circuit to request and receive the selected segments.

10. The apparatus of claim 9, wherein the processing circuit is configured to extract at least one of a region dependency, a bandwidth dependency and an image size dependency of the first segment stream to the second segment stream.

11. A method for image rendering, comprising:
receiving media presentation description information of media data, the media data including video content in a two-dimensional (2D) plane that is projected from video content of a sphere surface according to a projection, the video content in the 2D plane including a plurality of segment streams having different video coverage in the 2D plane, the media presentation description information using projection based spatial relationship description (P-SRD) to describe the different video coverage in the 2D plane according to the projection;
determining one or more segment streams based on a region of interests for image generation and the projection based spatial relationship description;
selecting segments in the one or more segment streams;
transmitting a request for the selected segments;
receiving the selected segments; and
displaying images generated based on the selected segments.

12. The method of claim 11, further comprising:
parsing the projection based spatial relationship description to extract a projection indicator.

13. The method of claim 12, further comprising:
parsing yaw and pitch coordinates in a sphere coordinate system from the projection based spatial relationship description when the projection indicator is indicative of an equirectangular projection (ERP).

14. The method of claim 13, wherein parsing the yaw and pitch coordinates in the sphere coordinate system from the projection based spatial relationship description when the projection indicator is indicative of the equirectangular projection (ERP) further comprises:
parsing a minimum value of yaw coordinate, a maximum value of yaw coordinate, a minimum value of pitch coordinate, and a maximum value of pitch coordinate from the projection based spatial relationship description that define a region in the 2D plane.

15. The method of claim 13, wherein parsing the yaw and pitch coordinates in the sphere coordinate system from the projection based spatial relationship description when the projection indicator is indicative of the equirectangular projection (ERP) further comprises:
parsing yaw and pitch coordinates that define a corner point of a rectangular region from the projection based spatial relationship description; and
parsing a width and a height of the rectangular region in yaw and pitch coordinates from the projection based spatial relationship description.

16. The method of claim 12, further comprising:
parsing one or more face indexes from the projection based spatial relationship description when the projection indicator is indicative of a platonic solid projection.

17. The method of claim 12, further comprising:
parsing coordinates in an Euclidean coordinate system from the projection based spatial relationship description when the projection indicator is indicative of no projection.

18. The method of claim 11, further comprising:
parsing the media presentation description information to extract a dependency of a first segment stream to a second segment stream;
selecting segments in the first segment stream and the second segment stream;
transmitting a request for the selected segments in the first segment stream and the second segment stream;
receiving the selected segments; and
displaying images generated based on the selected segments in the first segment stream and the second segment stream.

19. The method of claim 11, wherein the media presentation description information uses the P-SRD in at least one of an adaptation set level, a representation level, and a sub-representation level to describe the different video coverage in the 2D plane according to the projection.

20. The method of claim 18, wherein parsing the media presentation description information to extract the dependency of the first segment stream to the second segment stream further comprises:
extracting at least one of a region dependency, a bandwidth dependency and an image size dependency of the first segment stream to the second segment stream.

* * * * *